US008859866B2

(12) United States Patent
Onishi et al.

(10) Patent No.: US 8,859,866 B2
(45) Date of Patent: Oct. 14, 2014

(54) KEYBOARD INSTRUMENT

(75) Inventors: Kenta Onishi, Hamamatsu (JP); Rokurouta Mantani, Iwata (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 13/616,935

(22) Filed: Sep. 14, 2012

(65) Prior Publication Data

US 2013/0061733 A1 Mar. 14, 2013

(30) Foreign Application Priority Data

| | | |
|---|---|---|
| Sep. 14, 2011 | (JP) | 2011-200677 |
| Sep. 14, 2011 | (JP) | 2011-200678 |
| Sep. 14, 2011 | (JP) | 2011-200679 |
| Sep. 12, 2012 | (JP) | 2012-200456 |
| Sep. 12, 2012 | (JP) | 2012-200457 |
| Sep. 12, 2012 | (JP) | 2012-200458 |

(51) Int. Cl.

| | |
|---|---|
| ***G10C 1/00*** | (2006.01) |
| ***G01C 3/06*** | (2006.01) |
| ***G10H 1/00*** | (2006.01) |
| ***G10H 3/00*** | (2006.01) |
| ***G10H 1/08*** | (2006.01) |
| ***G10H 1/32*** | (2006.01) |
| ***G10C 3/06*** | (2006.01) |
| *H04R 3/08* | (2006.01) |
| *H04R 7/04* | (2006.01) |

(52) U.S. Cl.

CPC .. *G10C 3/06* (2013.01); *G10H 1/08* (2013.01); *G10H 2220/311* (2013.01); *H04R 3/08* (2013.01); *G10H 1/32* (2013.01); *G10H 2210/271* (2013.01); *H04R 7/045* (2013.01)

USPC .................... 84/174; 84/192; 84/600; 84/723

(58) Field of Classification Search

USPC .................................................... 84/174, 192

See application file for complete search history.

(56) References Cited

U.S. PATENT DOCUMENTS

| | | | | |
|---|---|---|---|---|
| 2,001,392 A * | 5/1935 | Miessner | ........................ | 84/723 |
| 5,170,000 A * | 12/1992 | Hayashida et al. | ............. | 84/192 |

(Continued)

FOREIGN PATENT DOCUMENTS

| | | |
|---|---|---|
| DE | 39 29 726 A1 | 3/1991 |
| EP | 0 573 963 A2 | 12/1993 |

(Continued)

OTHER PUBLICATIONS

Extended European Search Report dated Aug. 4, 2014, issued in corresponding European Patent Application No. 12184490.6.

*Primary Examiner* — David Warren
*Assistant Examiner* — Christina Russell
(74) *Attorney, Agent, or Firm* — Rossi, Kimms & McDowell LLP

(57) ABSTRACT

In a predetermined sound generation mode, a drive signal having a frequency characteristic corresponding to an operated key is supplied to an excitation unit provided on a soundboard. In response to a mechanical vibration generated by the excitation unit, the soundboard is vibrated so as to generate an acoustic vibration sound corresponding to the operated key. The excitation unit is supported by a supporting unit such that less or no load of the excitation unit except a vibration member vibrated in response to the drive signal is applied to the soundboard. Thus, only a load of the vibration member which is a very light portion of the excitation unit is applied to the soundboard, thereby vibration characteristics of the soundboard being hardly affected. When a sound damping mode is selected, a stopper is permitted to prevent a hammer from striking a sounding body.

9 Claims, 16 Drawing Sheets

(56) References Cited

U.S. PATENT DOCUMENTS

| | | | | |
|---|---|---|---|---|
| 5,247,129 | A * | 9/1993 | Nozaki et al. | 84/615 |
| 7,435,895 | B2 * | 10/2008 | Muramatsu | 84/741 |
| 7,678,988 | B2 * | 3/2010 | Sato et al. | 84/743 |
| 7,707,877 | B2 * | 5/2010 | Nishizu et al. | 73/149 |
| 7,893,344 | B2 * | 2/2011 | Hirano | 84/745 |
| 8,017,849 | B2 * | 9/2011 | Tajima et al. | 84/604 |
| 2003/0015086 | A1 * | 1/2003 | Katz | 84/644 |
| 2007/0017353 | A1 * | 1/2007 | Kunisada et al. | 84/723 |
| 2007/0028755 | A1 * | 2/2007 | Suzuki | 84/746 |
| 2008/0127798 | A1 * | 6/2008 | Sato et al. | 84/192 |
| 2009/0038469 | A1 * | 2/2009 | Suzuki | 84/744 |
| 2009/0211425 | A1 | 8/2009 | Jones et al. | |
| 2009/0241756 | A1 * | 10/2009 | Tajima et al. | 84/604 |
| 2009/0308220 | A1 * | 12/2009 | DiSanto | 84/177 |
| 2010/0050850 | A1 * | 3/2010 | Rahe | 84/174 |
| 2010/0147131 | A1 * | 6/2010 | Shinjo | 84/192 |
| 2010/0147132 | A1 * | 6/2010 | Shinjo et al. | 84/192 |
| 2010/0192756 | A1 * | 8/2010 | Kato et al. | 84/744 |
| 2013/0061734 | A1 * | 3/2013 | Koseki et al. | 84/189 |
| 2013/0092007 | A1 * | 4/2013 | Ohnishi et al. | 84/192 |
| 2013/0118333 | A1 * | 5/2013 | Ohnishi et al. | 84/192 |

FOREIGN PATENT DOCUMENTS

| | | | |
|---|---|---|---|
| EP | 2571016 | A2 | 3/2013 |
| EP | 2571020 | A2 | 3/2013 |
| EP | 2571287 | A2 | 3/2013 |
| JP | 8-111896 | A | 4/1996 |
| JP | 2007-328186 | A | 12/2007 |
| JP | 2008-292739 | A | 12/2008 |
| JP | 2008-310055 | A | 12/2008 |

* cited by examiner

KEYBOARD INSTRUMENT

BACKGROUND

The present invention relates to a technology for enriching a sound (i.e., musical sound or tone) of an acoustic keyboard instrument.

Usually, an electronic piano has no soundboard unlike an acoustic piano, because the electronic piano is configured to produce electronic sound from a speaker. However, Japanese patent application laid-open publication No. JP2008-292739A discloses a technology of mounting a soundboard on the electronic piano and installing speakers on the soundboard so that by exciting the soundboard with the speakers, a vibration sound is radiated from the soundboard. As a result, the electronic piano can produce not only electronic sounds but also enriched acoustic low-pitched sounds due to radiation of the vibration sounds from the soundboard. The above-mentioned patent literature also discloses that such a technology can be applied to not only the electronic piano but also a case where the acoustic piano is configured not to vibrate any strings (sound-deadening piano).

The sound quality of the acoustic piano largely depends on the vibration characteristics of the soundboard which radiates sounds. Consequently, if any heavy object or device is installed on the soundboard which nobody imagined when the piano was manufactured in plant, the vibration characteristics of the soundboard is changed largely due to an influence of the heavy object or device. As a result, an intrinsic sound quality of the acoustic piano deteriorates.

In a configuration of the above-described prior art technology of installing the speaker, which is a heavy object or device, directly to the soundboard, a weight of the speaker influences the soundboard, and the vibration characteristics of the soundboard is therefore changed largely between before and after the soundboard is mounted. Thus, when the above-described preceding technology is applied to the acoustic piano, the vibration characteristics of the soundboard is changed due to an influence of the speaker so that the intrinsic sound quality of the acoustic piano is influenced and changed, which is a problem.

SUMMARY OF THE INVENTION

In view of the foregoing prior art problems, an object of the present invention is to provide a keyboard instrument having a structure for exciting a soundboard in which the vibration characteristics of the soundboard is not adversely affected.

In order to accomplish the above-mentioned object, the present invention provides an improved keyboard instrument which comprises: a plurality of keys (2); a plurality of sounding bodies (5) each provided in corresponding relation to each of the plurality of keys (2); a plurality of hammers (4) each responsive to an operation of any one of the keys and adapted to strike the sounding body (5) corresponding to the operated key; a stopper (40) configured to be capable of preventing the hammer from striking the sounding body; a soundboard (7) configured to be vibrated with vibration of the sounding body; an excitation unit (50) including a vibration member (51, 81) connected to the soundboard (7) and a main body (52, 82) heavier than the vibration members, the excitation unit (50) adapted to generate at least one of attraction force and repulsion force between the vibration member and the main body in response to a drive signal supplied thereto to vibrate the vibration member; a supporting unit (55, 55B) configured to support the main body so that less or no load of the main body is applied to the soundboard at least in a state in which the soundboard is not vibrated; a performance information generation unit (120) adapted to generate performance information corresponding to an operation of the key; a signal generation unit (15) adapted to generate an audio waveform signal based on the performance information, the generated audio waveform signal being supplied to the excitation unit (50) as the drive signal to thereby vibrate the vibration member (51, 81); and a controlling unit (130) adapted to control the stopper (40) in such a manner as to permit or not to permit the stopper to prevent the hammer from striking the sounding body when the vibration member (51, 81) is vibrated in response to the drive signal. Note that the same reference characters as used for various constituent elements of later-described embodiments of the present invention are indicated in parentheses here for ease of understanding.

According to the present invention, the excitation unit includes the vibration members connected to the soundboard and the main body heavier than the vibration members, and the excitation unit generates at least one of attraction force and repulsion force between the vibration member and the main body in response to the drive signal supplied thereto to vibrate the vibration member. The supporting unit is configured to support the main body so that less or no load of the main body is applied to the soundboard at least in a state in which the soundboard is not vibrated. Consequently, a load on the soundboard due to installation of the excitation unit can be minimized so that the vibration characteristic of the soundboard of an acoustic keyboard instrument is never affected adversely. As a result, as well as an acoustic sound inherent of the keyboard instrument, additional acoustic sound can be generated due to a positive vibration of the soundboard, so as to enrich the acoustic sound which the keyboard instrument is capable of generating. Particularly, by provision of the controller which controls the stopper in such a manner as to permit or not to permit the stopper to prevent the hammer from striking the sounding body when vibrating the vibration member in response to the drive signal, it can be achieved to selectively perform one of a control for generating only an acoustic sound based on the vibration of the soundboard while inhibiting to generate an acoustic sound inherent of the keyboard instrument and a control for generating both of the acoustic sounds at the same time, thereby the sound generation modes achievable by the acoustic keyboard instrument are diversified.

In an embodiment, any one of a plurality of sound generation modes is selectable, and when a predetermined special sound generation mode is selected by a user from among the plurality of the sound generation modes, the vibration member (51) is vibrated according to the drive signal.

In an embodiment, wherein, if the selected predetermined special sound generation mode is a first special sound generation mode, the controlling unit (130) permits the stopper (40) to prevent the hammer from striking the sounding body.

In an embodiment, the main body (52, 52B) has a magnet, and the vibration member (51) has a voice coil which is arranged on a magnetic path formed by the magnet and to which the drive signal is input.

In an embodiment, the vibration member (51) and the main body (52, 52B) are separated from each other by space, and the supporting unit (55, 55B) supports the main body such that the main body (52, 52B) is not in contact with the soundboard.

In an embodiment, the vibration member (51) and the main body (52) are connected via a damper unit (53), and the supporting unit (55) supports a load of the vibration member via the damper unit and the main body in a state in which the vibration member is not vibrating.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION

[Overall Configuration]

Figure 1:
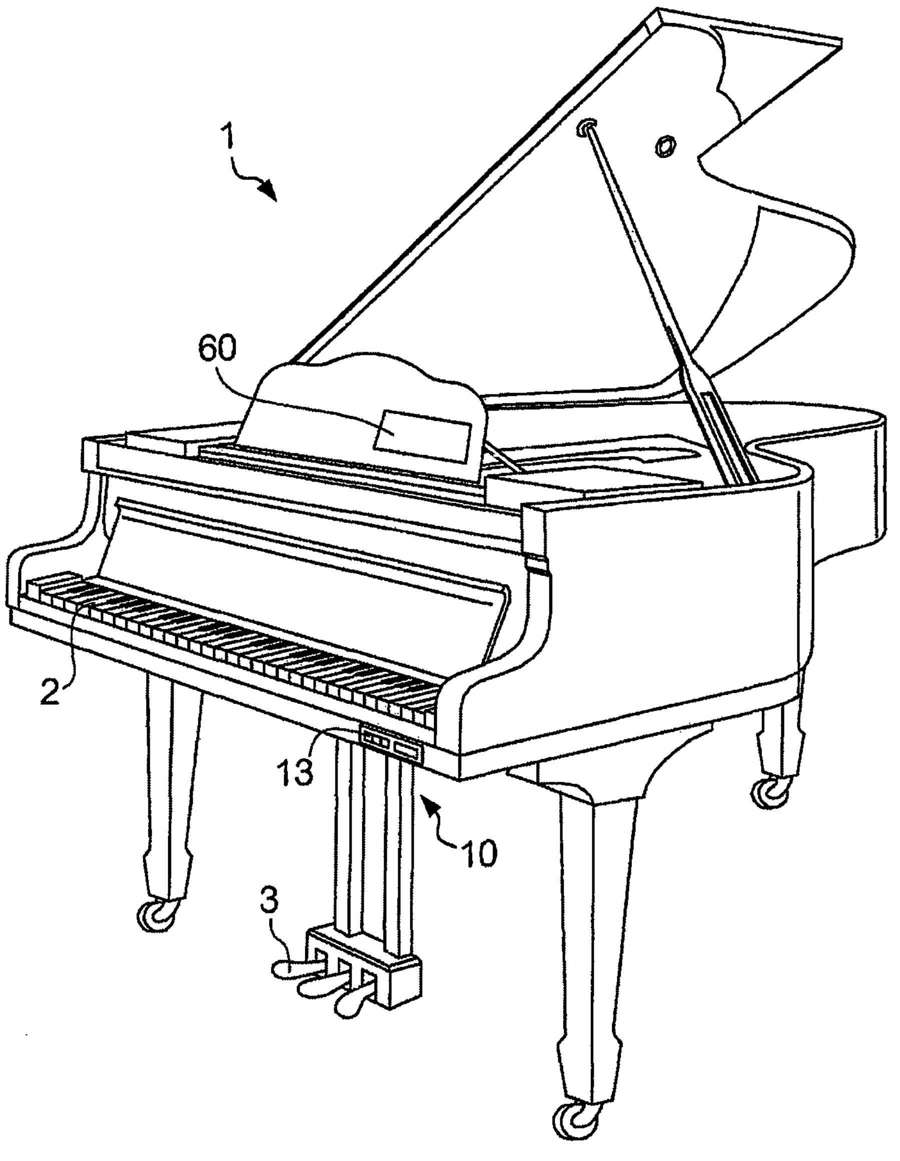
FIG. 1 is a perspective view showing an outer appearance of a grand piano according to an embodiment of the present invention.

FIG. 1 is a perspective view showing an outer appearance of a grand piano 1 according to an embodiment of the present invention. Like known grand pianos, the grand piano 1 has a keyboard in which a plurality of keys 2 to be operated by a performer or user are arranged on its front side and pedals 3 for controlling a musical performance. The grand piano 1 also includes a control device 10 having an operation panel 13 on its front surface portion and a touch panel 60 provided on a portion of a music stand. User's instructions can be input to the control device 10 by user's operation of the operation panel 13 and the touch panel 60.

The grand piano 1 is configured to be capable of generating a sound in a sound generation mode which is selected from among a plurality of sound generation modes in accordance with a performer's (user's) instruction. These sound generation modes include (1) normal sound generation mode, (2) sound damping mode, and (3) sound intensifying mode.

The normal sound generation mode (1) is a mode for generating a sound based on only a vibration of a string generated in response to striking of the string by a hammer corresponding to an operated key. The sound damping mode (2), namely a "special sound generation mode 1", is a mode for generating a sound based on only an actively-vibrated-soundboard sound which is generated from a soundboard when the soundboard is physically vibrated according to a drive signal based on an audio waveform signal generated from a sound source, such as an electronic sound source, in correspondence with an operation of a key, while hammering of the string is blocked by means of a stopper.

In other words, in the sound damping mode (2), the stopper is permitted to prevent the hammer from striking the string corresponding to the operated key. Thus, the generated actively-vibrated-soundboard sound has a feature of an acoustic sound having natural feeling.

The sound intensifying mode (3), namely a "special sound generation mode 2", is a mode for generating a sound based on both of the vibration of the string and the actively-vibrated-soundboard sound. In other words, in the sound intensifying mode (3), the stopper is not permitted to prevent the hammer from striking the string corresponding to the operated key. It should be noted that, in the sound intensifying mode (3), not only a total volume of the generated sound can be intensified, but also a tone color layer effect can be achieved, because a first acoustic sound based on striking of the string by the hammer (namely, the sound based on the vibration of the string) having a piano intrinsic tone color and a second acoustic sound (namely, the actively-vibrated-soundboard sound) having an arbitrary additional tone color obtained by vibrating forcedly the soundboard according to the drive signal having the audio waveform of an arbitrary tone color (including a tone color similar to a piano tone color) are generated at the same time. Therefore, the sound intensifying mode (3) also functions as a performance mode capable of obtaining the tone color layer effect.

The sound generation mode may include other sound generation modes such as sound deadening mode. When the sound deadening mode is selected, under the same configuration as the sound damping mode, an electronic musical sound signal (audio waveform signal) generated from a sound source is supplied to a headphone terminal without being used as a soundboard drive signal. Consequently, a performer can listen to the sound based on the electronic musical sound signal in private (without spreading the musical sound into external space).

Table 1 lists the sound generation modes as follow.

TABLE 1

| | Function of blocking hammering of strings | |
|---|---|---|
| | Invalid (with hammering of strings) | Valid (without hammering of strings) |
| No vibration by an excitation unit | Soundboard characteristics of an acoustic piano do not influenced, and the acoustic piano can be played at an intrinsic performance of the piano.(normal sound generation mode) | The acoustic piano functions as a sound-deadening piano in which a performer listens to a played sound through a headphone without sounding outside |
| With vibration by an excitation unit (tone color of piano) | Capable of not only intensifying the volume of sound but also obtaining an effect such as a honky-tonk-piano-like-effect by slightly detuning the actively-vibrated-soundboard sound (sound intensifying mode) | Resonance of the string is valid so that natural resonant effect can be obtained. (sound damping mode) |
| With vibration by an excitation unit (other tone colors than piano) | Obtaining an effect in which a sound of acoustic piano and a actively-vibrated-soundboard sound of a tone color having an affinity for the acoustic piano sound like strings tone color are integrated on the soundboard (sound intensifying mode) | Enjoying playing at other tone than the piano tone color while obtaining a feeling of the natural acoustic field of the piano soundboard and a resonant effect of the string (sound damping mode) |

Also, the grand piano 1 is constructed to be able to operate in a performance mode selected by a user from among a plurality of performance modes. The performance modes includes a normal performance mode in which the user (performer) plays the piano to produce sound, and an automatic performance mode in which keys are automatically driven to produce automatically-performed sounds. To carry out the present invention, the grand piano 1 may be configured to be capable of realizing at least any one of the performance modes.

[Construction of Grand Piano 1]

Figure 2:
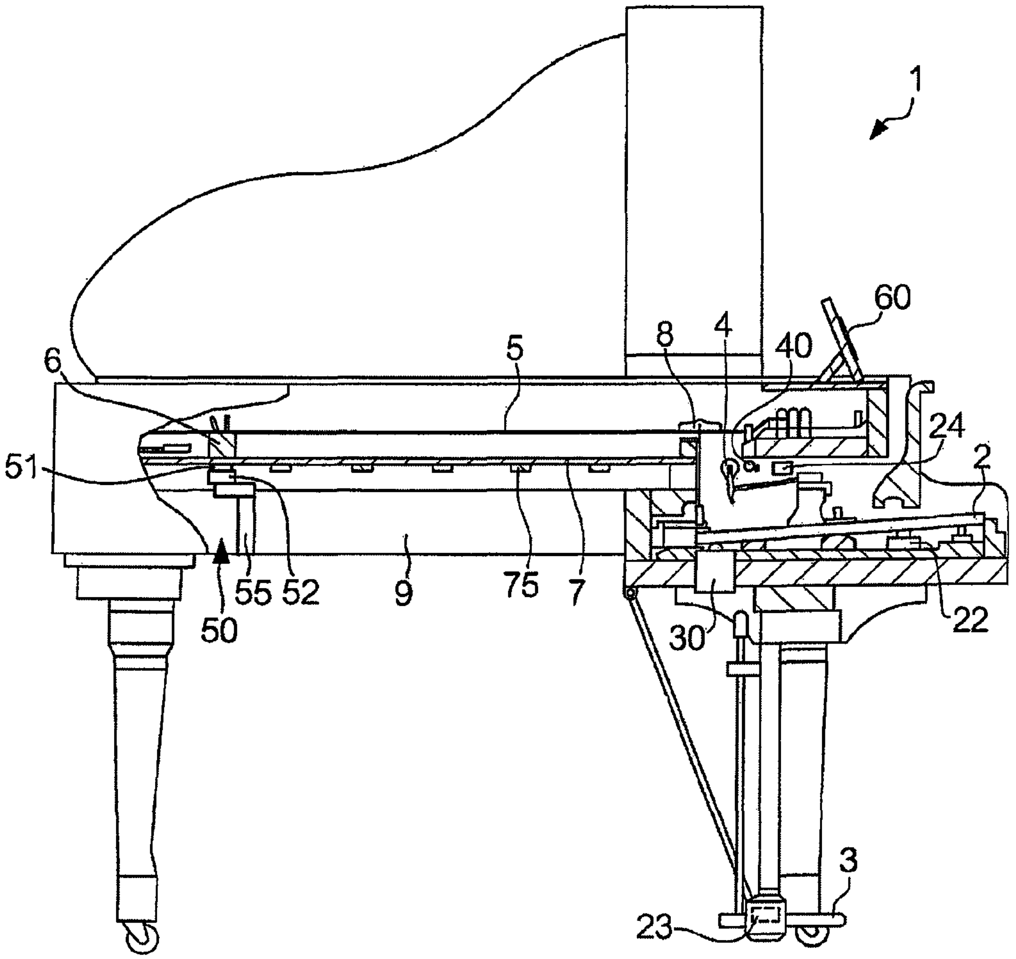
FIG. 2 is a view explanatory of an internal construction of the grand piano according to the embodiment.

FIG. 2 is a view explanatory of an internal construction of a grand piano 1 according to the embodiment of the present invention. In FIG. 2, an inner construction corresponding to only one key 2 is shown with an inner construction corresponding to the other keys 2 omitted for simplicity of illustration.

Underneath a back end portion (i.e., end portion remote from the user of the grand piano 1) of each of the keys 2 is provided a key drive unit 30 for driving the key 2 by use of a solenoid. The key drive unit 30 drives the solenoid in accordance with a control signal given from the control device 10. More specifically, the key drive unit 30 drives the solenoid to raise a plunger so as to reproduce a similar state to when the user has depressed the key 2, and lowers the plunger to reproduce a similar state to when the user has released the key 2. Namely, a difference between the ordinary performance mode and the automatic performance mode is whether the key 2 is driven by a user's operation or by the key drive unit 30.

Hammers 4 are provided in corresponding relation to the keys 2. Thus, once any one of the keys 2 is depressed by the user, depressing force is transmitted to the corresponding hammer 4 via an action mechanism (not shown), so that the hammer 4 moves to strike the corresponding string 5. A damper 8 is brought out of or into contact with the string 5 in accordance with a depressed amount of the key 2 and a pressed-down amount of a damper pedal of the pedals 3; hereinafter, the "pedal 3" will refer to the damper peal unless otherwise stated. When in contact with the string 5, the damper 8 suppresses vibration of the string 5.

Generally, in the acoustic grand piano, as well known in the art, a combination of a plurality of strings (or at least one string) is provided in association with each key. In this disclosure, the string 5 corresponding to one key 2 actually comprises such a combination of one or a plurality of strings. Namely, in this disclosure, a combination of one or a plurality of strings provided in association with each key will be referred to as simply as "string 5" for convenience of description.

In the above-mentioned sound damping mode, a stopper 40 prevents the hammer 4 from striking the string 5. Namely, when the sound generation mode is set in the sound damping mode, a hammer shank collides against the stopper 40 so that the hammer 4 is prevented from striking the string 5. On the other hand, when the sound generation mode is set in the normal sound generation mode or the sound intensifying mode, the stopper 40 moves to a position where it does not collide against the hammer shank.

Key sensors 22 are provided in corresponding relation to the keys 2 and underneath the corresponding keys 2, and each of the key sensors 22 outputs a detection signal corresponding to a behavior of the key 2 to the control device 10. In the illustrated example, each of the key sensors 22 detects a depressed amount of the corresponding key 2 and outputs, to the control device 10, a detection signal indicative of the detected depressed amount (detected result). Instead of outputting the detected depressed amount of the key 2 as a detection signal, the key sensor 22 may output a detection signal indicating that the key 2 has passed a particular depressed position. Here, the particular depressed position refers to any suitable position, preferably a plurality of positions, within a range from a rest position to an end position of the key 2. Namely, the detection signal to be output from the key sensor 22 may be any kind of signal as long as it allows the control device 10 to recognize behavior of the corresponding key 2.

Hammer sensors 24 are provided in corresponding relation to the hammers 4, and each of the hammer sensors 24 outputs, to the control device 10, a detection signal representing behavior of the corresponding hammer 4. In the illustrated example, the hammer sensor 24 detects a moving speed of the hammer 4 immediately before striking the string 5, and outputs, to the control device 10, a detection signal indicative of the detected moving speed (detected result). Note that this detection signal need not necessarily be indicative of the moving speed of the hammer 4 itself and may be indicative of a moving speed of the hammer 4 calculated in the control device 10 as another form of detection signal. For example, the detection signal may be one indicating that the hammer shank has passed two predetermined positions during movement of the hammer 4, or one indicative of a time length from a time point at which the hammer shank has passed one of the two positions to a time point at which the hammer shank has passed the other of the two positions. Namely, the detection signal to be output from the hammer sensor 24 may be any kind of signal as long as it allows the control device 10 to recognize behavior of the corresponding hammer 4.

Pedal sensors 23 are provided in corresponding relation to the pedals 3, and each of the pedal sensors 23 outputs, to the control device 10, a detection signal representing behavior of the corresponding hammer 3. In the illustrated example, the pedal sensor 23 detects a pressed-down amount of the pedal 3 and outputs, to the control device 10, a detection signal indicative of the detected pressed-down amount (detected result of the pedal 3). Alternatively, the pedal sensor 23 may output a detection signal indicating that the pedal 3 has passed a particular press-down position, instead of outputting a detection signal corresponding to a pressed-down amount of the pedal 3. Here, the "particular press-down position" is any suitable position within a range from a rest position to an end position of the pedal 3, and the particular press-down position is desirably set at a position to permit discrimination between the contacting state where the damper 8 and the string 5 are in complete contact with each other and the non-contacting state where the damper 8 and the string 5 are out of contact with each other. It is further desirable that a plurality of such particular press-down positions be set so as to permit detection of a half-pedal state as well. Namely, the detection signal to be output from the pedal sensor 23 may be any kind of signal as long as it allows the control device 10 to recognize behavior of the pedal 3.

As long as the control device 10 is constructed in such a manner that, with the detection signals output from the key sensors 22, pedal sensors 23 and hammer sensors 24, it can identify, for each individual key (key number) 2, a time point (string-striking time point) at which the hammer 4 has struck the string 5 (i.e., key-on event time), striking velocity and a time point (vibration-suppressing time point) at which the damper 8 has suppressed vibration of the string (key-off event time point), then each of the key sensors 22, pedal sensors 23 and hammer sensors 24 may output detected results of behavior of the key 2, pedal 3 and hammer 4 as other forms of detection signals than the aforementioned.

As conventionally known in the art, a soundboard 7 of the piano is backed with a plurality of ribs (or bracing members) 75, and a bridge 6 spanning between the strings 5 are fixed to a front surface of the soundboard 7. Hereinafter, the bridge 6 may refer to a "first bar-like member" and ribs 75 may refer to a "second bar-like member". In playing the piano in an ordinary manner, vibration of the string 5 struck by the hammer 4 is propagated (or transmitted) to the soundboard 7 through the bridge 6.

Figure 5:
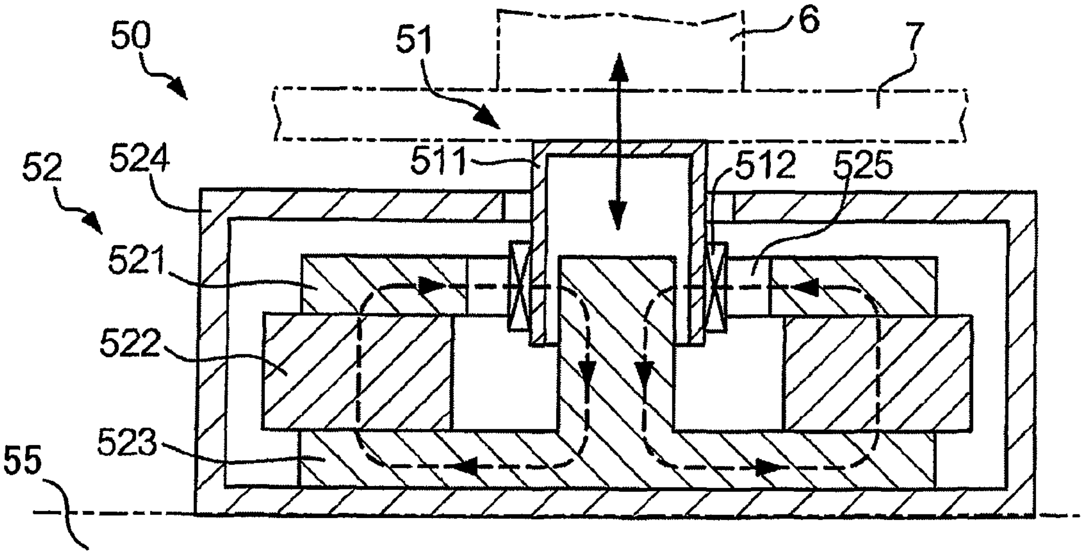
FIG. 5 is a cross-sectional view of the excitation unit shown in FIG. 4.

According to the present invention, an excitation unit 50 is mounted on a suitable portion of the soundboard 7. The excitation unit 50 has a vibrating member 51 connected to the soundboard 7 and a yoke-holding unit (i.e., a main body) 52. The yoke-holding unit (main body) 52 is supported by a supporting unit 55 connected to a straight supporting column 9. In a specified sound generation mode (namely, the above-mentioned sound damping mode or sound intensifying mode), the excitation unit 50 is supplied with a drive signal from the control device 10. The vibration member 51 vibrates in response to electronic audio waveforms represented by a supplied drive signal to thereby vibrate the soundboard 7. In this way, an acoustic vibration sound is generated from the soundboard 7. The bridge 6 is also vibrated along with the vibration of the soundboard 7 and thus the vibration of the soundboard 7 is propagated (or transmitted) to the strings 5 through the bridge 6. In one embodiment as shown in FIG. 5, the vibration member 51 includes yokes 521, 523 contained in the yoke-holding unit 52 and a voice coil 512 arranged to be positioned in a magnetic path formed by a magnet 522 of a ring shape, and the vibration member 51 is vibrated according to a drive signal input by the voice coil 512.

Figure 3:
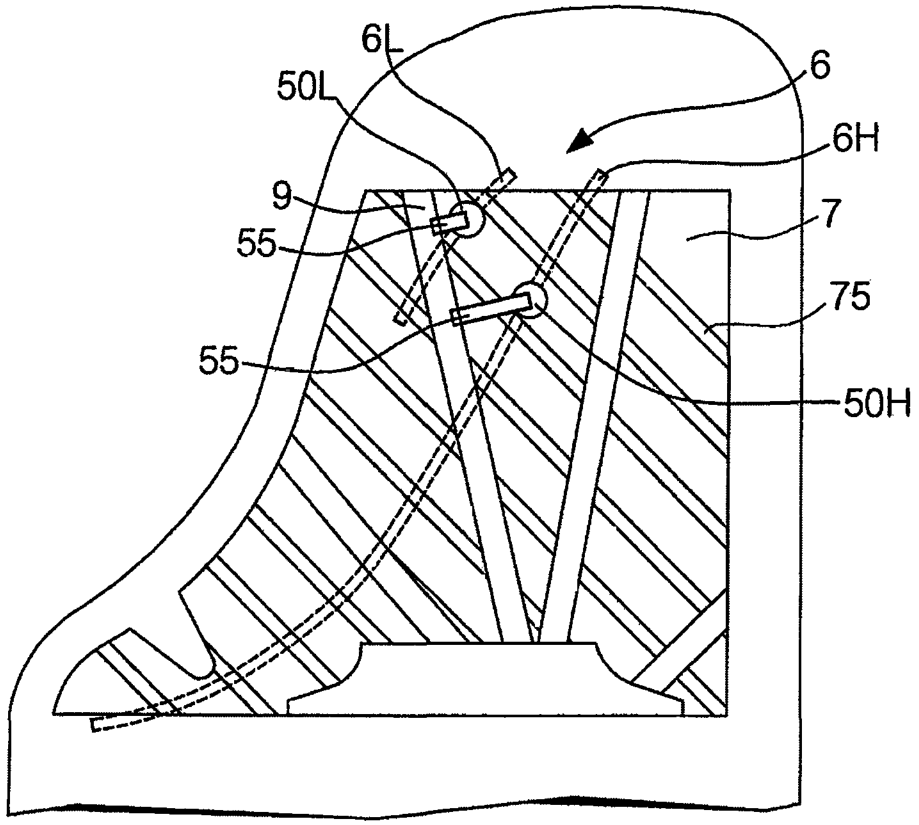
FIG. 3 is a view explanatory of an arrangement of an excitation unit in the grand piano according to the embodiment.

FIG. 3 is a diagram, illustrating an arrangement of the excitation unit 50 according to the embodiment of the present invention. In the illustrated example, as the excitation unit 50, two excitation units 50H, 50L are provided. If it is not especially necessary to distinguish between the excitation unit 50H and the excitation unit 50L, an expression of just the excitation unit 50 will be used.

In the illustrated example, the excitation units 50H, 50L are mounted on a rear surface of the soundboard 7 between two ribs 75. Of the two bridges 6 (namely, long bridge 6H and short bridge 6L), the excitation unit 50H is arranged at a position corresponding to the long bridge 6H, and the excitation unit 50L is arranged at a position corresponding to the short bridge 6L. That is, it comes that the soundboard 7 is sandwiched by the excitation units 50 and the bridges 6.

Note that the number of the excitation units 50 to be provided on the soundboard 7 is not limited to two but may be larger or only one. If only one excitation unit 50 is provided, preferably, the excitation unit 50 is arranged at a position corresponding to the long bridge 6H.

The long bridge 6H is a bridge for supporting a predetermined group of the strings corresponding a predetermined higher tone pitch range and the short bridge 6L is a bridge for supporting a predetermined group of the strings 5 corresponding a predetermined lower tone pitch range. Hereinafter, if it is not especially necessary to distinguish between the bridge 6H and the bridge 6L, the bridges will be expressed as just bridge 6. As described above, the excitation unit 50 is supported by the supporting unit 55 connected to the straight supporting column 9.

[Construction of Excitation Unit 50]

Figure 4:
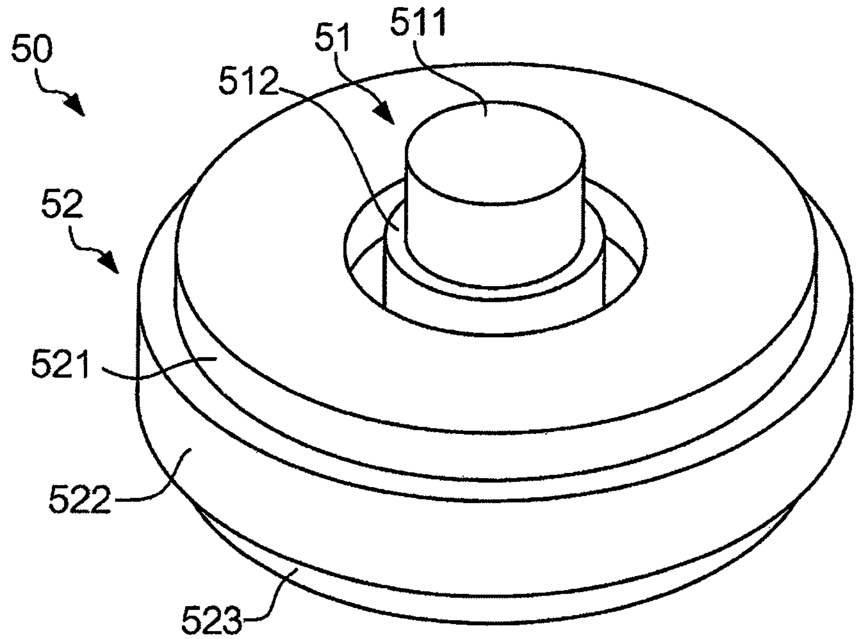
FIG. 4 is a perspective view showing an outer appearance of the excitation unit according to the embodiment.

FIG. 4 is a diagram, illustrating an appearance of the excitation unit 50 according to the embodiment of the present invention. To represent a main structure of the yoke-holding unit 52 easily understandably, this diagram illustrates the interior of a casing 524 while omitting representation of the casing 524 (see FIG. 5) of the yoke-holding unit 52. The vibration member 51 has a cylindrical connecting member 511 whose top face to be connected to the soundboard 7 is closed, and a voice coil 512. The connecting member 511 is made of a light weight material like a resin such as polyimide or a metal such as aluminum, and a cap made of resin or the like is mounted to the top face thereof. The yoke-holding unit 52 has the yokes 521, 523 which sandwich a magnet 522. The yokes 521, 523 are made of a soft magnetic material, for example, soft iron and much heavier than the connecting member 511. The vibration member 51 and the yoke-holding unit 52 are disposed apart from each other via a space or air gap. That is, the yoke-holding unit 52 is coupled magnetically with the voice coil 512 via an air gap.

FIG. 5 is a cross-sectional view of the excitation unit 50 shown in FIG. 4, taken along a vertical plane passing through the center of the connecting member 511, as seen from a horizontal direction. FIG. 5 depicts the casing 524 also, whose representation is omitted in FIG. 4. In FIG. 5, positions of the soundboard 7 and the bridge 6 are represented with a dashed line to indicate a positional relationship between the excitation unit 50, the soundboard 7 and the bridge 6. The vibration member 51 comprises the connecting member 511 and the voice coil 512 wound around the connecting member 511. In a whole magnetic path (indicated with a dashed line having an arrow) formed by the yokes 521, 523 and the magnet 522, the voice coil 512 is movably disposed in a magnetic path portion passing through a space formed between the yoke 521 and the yoke 523. The drive signal supplied to the excitation unit 50 is input to the voice coil 512. Receiving a magnetic force from the magnetic path formed as described above, the voice coil 512 generates a drive force for vibrating the connecting member 511 in a vertical direction in FIG. 5 according to a waveform indicated by the input drive signal. Because the yoke-holding unit 52 is supported by the supporting unit 55 so that the position of the yoke-holding unit 52 is fixed, most of all the drive force generated by the voice coil 512 is used as a thrust force for vibrating the connecting member 511.

The top face of the connecting member 511 and the soundboard 7 are bonded to each other with adhesive or double-sided tape (not illustrated), so that the connecting member 511 is firmly fixed to the soundboard 7. Connection between the connecting member 511 and the top face of the connecting member 511 is not limited to by bonding with adhesive, but may be by connection with a screw or the like. Consequently, when the connecting member 511 moves upward, the soundboard 7 is pushed upward, and when the connecting member 511 moves downward, the soundboard 7 is pulled downward by the connecting member 511 without the connecting member's 511 leaving the soundboard 7. As described above, due to the connection between the connecting member 511 and the soundboard 7, the soundboard 7 is moved accurately both in positive and negative directions in the drive waveform. As a result, a vibration faithful to the waveform characteristics of a desired tone can be produced in the soundboard 7. The vibration of the connecting member 511 not only vibrates the soundboard 7, but also is propagated to the bridge 6 through the soundboard 7 and furthermore, to the string 5.

The casing 524 accommodates the yokes 521, 523 and the magnet 522. The casing 524 is supported by the supporting unit 55. In this way, the yoke-holding unit 52 constituted of the yokes 521, 523, the magnet 522 and the casing 524 are disposed apart from the vibration member 51 via the space or air gap and supported by the supporting unit 55 such that the yoke-holding unit 52 is not in contact with the soundboard 7. As illustrated in FIG. 5, in this example, the supporting unit 55 supports the yoke-holding unit 52 from a bottom side of the casing 524. Because the vibration member 51 (connecting member 511) is disposed apart from the yoke-holding unit 52 via the space or air gap, it comes that the vibration member 51 is supported by the soundboard 7 when connected to the soundboard 7.

Note that the fact that the vibration member 51 and the yoke-holding unit 52 are separated from each other by the space means that in the illustrated configuration, the vibration member 51 and the yoke-holding unit 52 are not in contact with each other. Instead, a partial structure (e.g., wiring leading to the voice coil 512) leading to the vibration member 51 may be in contact with the yoke-holding unit 52. At this time, it is desired that no load is applied from the yoke-holding unit 52 to the vibration member 51 via that partial structure.

In this way, the yoke-holding unit (main body) 52 in the excitation unit 50 is supported by the supporting unit 55, less or no load of the excitation unit 50 except the vibration member 51 is applied to the soundboard 7. The structure of the supporting unit 55 for supporting the yoke-holding unit 52 may be of any structure as long as no load except the load of the vibration member 51 is applied to the soundboard 7.

As described above, the connecting member 511 is made of light material like resin, compared to the material of the yoke-holding unit 52. The entire vibration member 51 including the connecting member 511 and the voice coil 512 is formed of a very light weight structure compared to the yoke-holding unit (main body) 52. Because a load of the yoke-holding unit 52 is applied to the straight supporting column 9 via the supporting unit 55, little load of the excitation unit 50 may be applied to the soundboard 7. Although a load of the vibration member 51 acts on the soundboard 7, this load is so slight that an influence thereof upon the vibration characteristics of the soundboard is minimized.

[Construction of Voice Coil 512]

Figure 6:
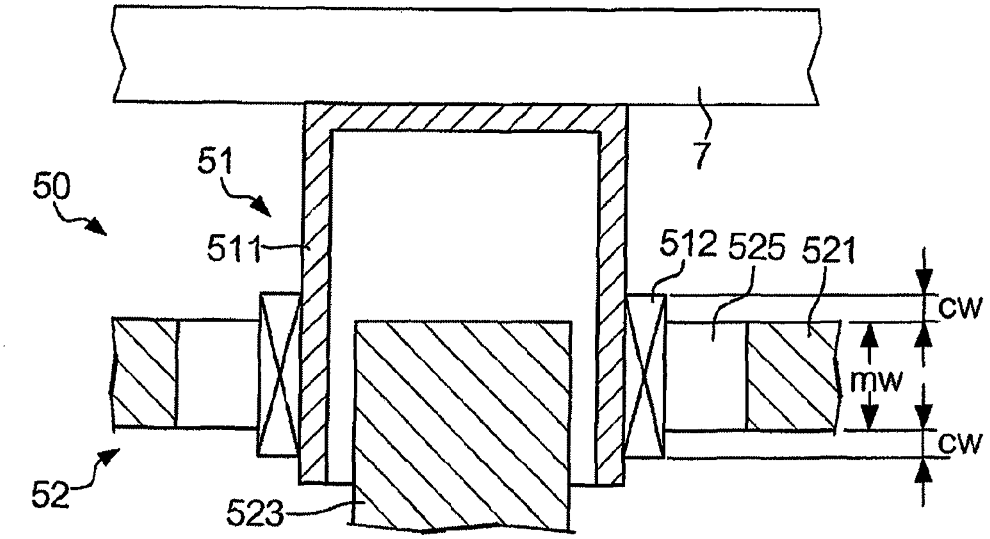
FIG. 6 is a cross-sectional view explanatory of a structure of a voice coil included in the excitation unit according to the embodiment.

FIG. 6 is a diagram, illustrating the structure of the voice coil 512 according to the embodiment of the present invention. FIG. 6 indicates a position of the vibration member 51 when it is not vibrated. Hereinafter, the position of the vibration unit 51 when it is not vibrated is referred to as a standard position. A length in the vertical direction (vibration direction of the vibration member 51) of the voice coil 512 (hereinafter referred to as just a length of the voice coil 512) is a sum of the length in the vertical direction of a magnetic path space 525 (hereinafter referred to as a magnetic path width mw) and upper and lower vibration partial lengths cw each corresponding to an either end portion upper or lower than the magnetic path width mw. That is, the length of the voice coil 512 is a length which is a sum of the magnetic path width mw and a double of the vibration partial length cw. Although the magnetic path width mw is specified as a length equivalent to the thickness of the yoke 521 as illustrated in FIG. 6, actually, there exists a spread of a magnetic field. Thus, it is permissible to consider that the spread is included in the magnetic path space 525 and determine the magnetic path width mw to be value larger than the thickness of the yoke 521 shown in FIG. 6.

Figure 7A:
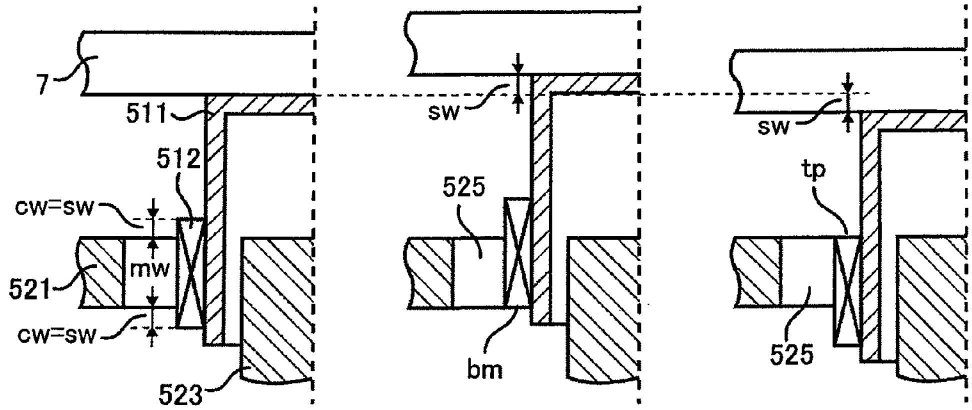
FIGS. 7A to 7C are cross-sectional views showing three different types of voice coils to illustrate an optimum construction the voice coil to be used in the excitation unit according to the embodiment.
Figure 7B:
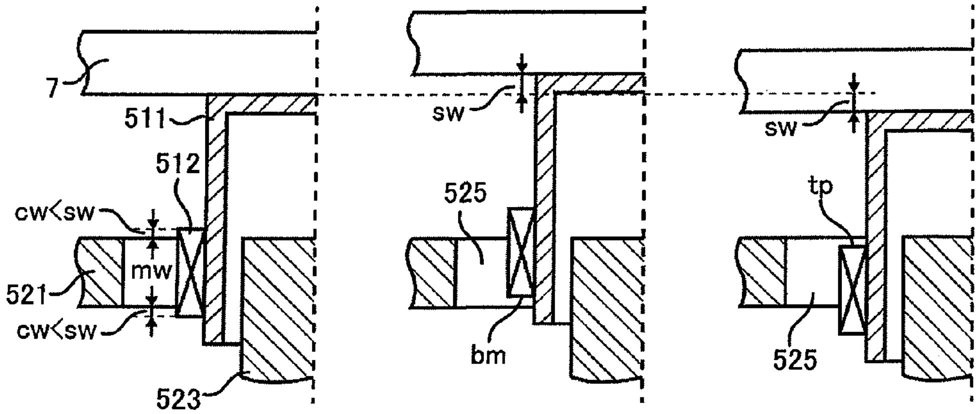
Figure 7C:
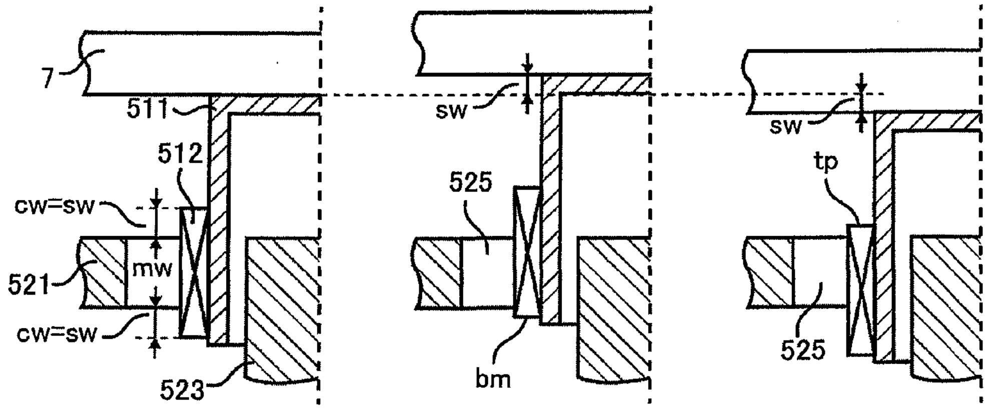

FIGS. 7A to 7C are cross-sectional views illustrating vibration conditions of the voice coil 512 in the embodiment of the present invention regarding three different dimensions of the voice coil 512. In FIGS. 7A to 7C, a reference sw indicates an amount of deflection (i.e., a maximum deflection amount sw) from the standard position of the vibration member 51 when the drive signal of a maximum amplitude is input to the voice coil 512 under a condition that the connecting member 511 is connected to the soundboard 7. In FIGS. 7A to 7C, relative dimensions of the length of the voice coil 512 with respect to the magnetic path width mw are different from each other. That is, FIG. 7A indicates a case where the vibration partial length cw is equal to the maximum deflection amount sw. FIG. 7B indicates a case where the vibration partial length cw is shorter than the maximum deflection amount sw. FIG. 7C indicates a case where the vibration partial length cw is longer than the maximum deflection amount sw. In each of FIGS. 7A to 7C, a diagram located at the left thereof indicates a state in which the vibration member 51 is at the standard position, a diagram located at the middle thereof indicates a state in which the vibration member 51 is moved upward by the maximum deflection amount sw, and a diagram located at the right thereof indicates a state in which the vibration member 51 is moved downward by the maximum deflection amount sw.

As illustrated in FIG. 7A, in which cw=sw, when the deflection of the vibration member 51 is maximum upward, a bottom end bm of the voice coil 512 is located at a bottom end of the magnetic path space 525. When the deflection of the vibration member 51 is maximum downward, a top end tp of the voice coil 512 is located at a top end of the magnetic path space 525. In this case, a portion having a length equivalent to the magnetic path width mw in the voice coil 512 is always situated in the magnetic path space 525. Thus, the vibration member 51 can obtain a drive force stable regardless of the magnitude of the deflection during the excitation.

As illustrated in FIG. 7B, in which cw<sw, when the deflection of the vibration unit 51 is maximum upward, the bottom end bm of the voice coil 512 is located within the magnetic path space 525. When the deflection of the vibration member 51 is maximum downward, the top end tp of the voice coil is located within the magnetic path space 525. In this case, when the deflection of the vibration unit 51 is increased, a length located within the magnetic path space 525 of the voice coil 512 is shorter than the magnetic path width mw. Thus, a drive force which should be obtained from the drive signal may not be obtained sufficiently. However, when no large drive signal which causes the vibration member 51 to reach the maximum deflection is input, the vibration member 51 can obtain a stable drive force like when cw=sw.

On the other hand, when the length of the voice coil 512 is decreased as shown in FIG. 7B, the number of windings per a unit length must be changed. Because the number of the windings of the coil is decreased and inductance is decreased, there occurs an effect that an excellent responsiveness can be obtained even in a high frequency range.

As illustrated in FIG. 7C, in which cw>sw, when the deflection of the vibration member 51 is maximum upward also, the bottom end of the voice coil 512 is located out of the magnetic path space 525. When the deflection of the vibration member 51 is maximum downward, the top end tp of the voice coil 512 is located out of the magnetic path space 525. In this case, like when cw=sw, a portion having a length equivalent to the magnetic path width mw in the voice coil 512 is always located within the magnetic path space 525. Thus, the vibration member 51 can obtain a drive force stable regardless of the magnitude of the displacement of the vibration member 51 during the excitation.

On the other hand, in the voice coil 512, a portion located out of the magnetic path space 525 does not contribute to the drive force. Furthermore, if the length of the voice coil 512 is increased as shown in FIG. 7C, the number of windings of the coil increases unless the number of windings per a unit length is changed, thereby increasing inductance. Consequently, a frequency band in which an excellent responsiveness can be obtained is limited to a low frequency band.

As described above, in case where cw>sw, the responsiveness in a high frequency band is deteriorated and there is no advantageous factor, compared to the case where cw=sw. Therefore, according to the embodiment of the present invention, it is determined that the vibration partial length cw is equal to or smaller than the maximum deflection amount sw. That is, the length of the voice coil 512 is determined to be equal to or smaller than a sum of the magnetic path width mw and a double of the maximum deflection amount sw. To make the vibration partial length cw shorter than the maximum deflection amount sw, an appropriate design is made considering an amplitude of the vibration member 51 which generally can occur when the soundboard 7 is vibrated, and a frequency band contained in the drive signal.

[Construction of Yokes 521, 523]

Figure 8A:
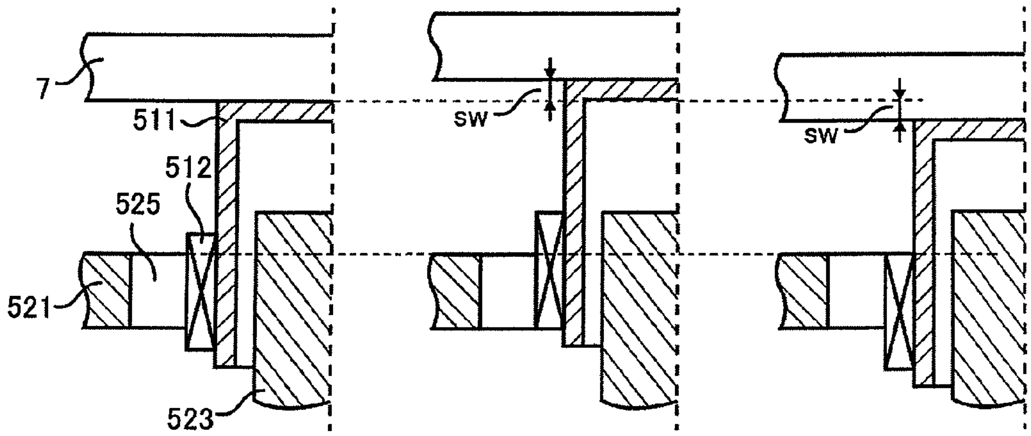
FIGS. 8A to 8C are cross-sectional views showing three different arrangements of yokes to illustrate an optimum arrangement of a yoke in the excitation unit according to the embodiment.
Figure 8B:
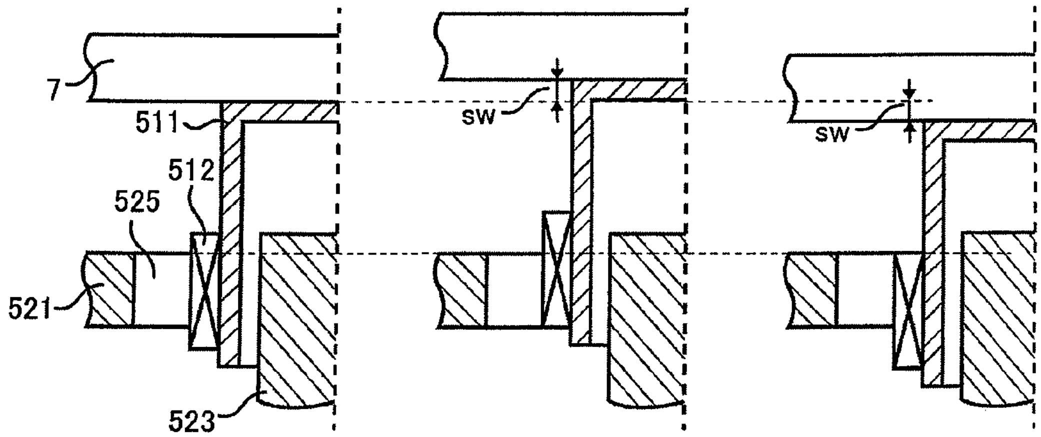
Figure 8C:
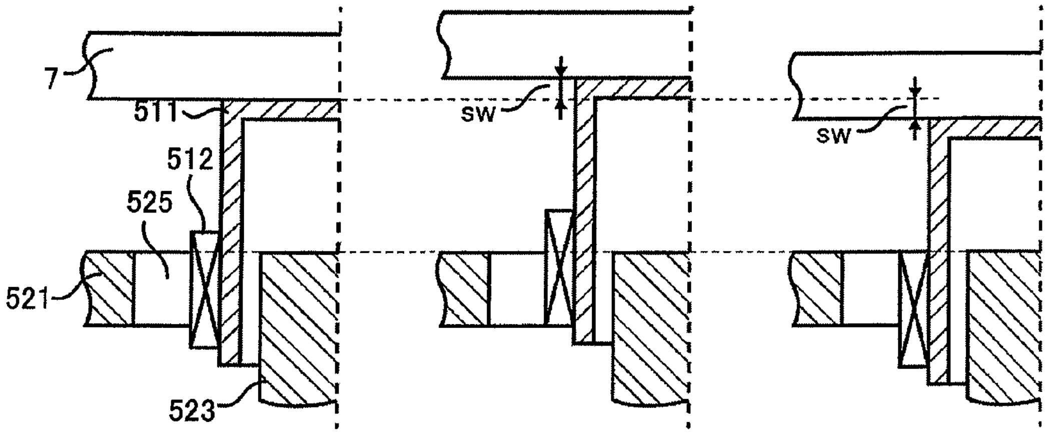

FIGS. 8A to 8C are cross-sectional views, illustrating a relationship between the top face of the yoke 521 (hereinafter referred to as a plate top face), the top face of the voice coil 512, and the top face of a pole of the yoke 523 (hereinafter referred to as a pole top face). FIG. 8A indicates a case where when the vibration unit 51 is deflected upward by the maximum deflection amount sw, the height of the pole top face is set to the same position as the top end of the voice coil 512. FIG. 8B indicates a case where when the vibration unit 51 is situated at the standard position, the height of the pole top face is set to the same position as the top end of the voice coil 512. FIG. 8C indicates a case where the height of the pole top face is set to the same position as the plate top face. It should be noted that in any case of FIGS. 8A to 8C, the length of the voice coil 512 is assumed to be a sum of the magnetic path width mw and a double of the vibration partial length cw. In each of FIGS. 8A to 8C, a diagram located at the left thereof indicates a state in which the vibration unit 51 is situated at the standard position, a diagram located at the middle thereof indicates a state in which the vibration unit 51 is moved upward by the maximum deflection amount sw, and a diagram located at the right thereof indicates a state in which the vibration unit 51 is moved downward by the maximum deflection amount sw.

In the case indicated in FIG. 8A, when the deflection of the vibration unit 51 is maximum upward, the top end of the voice coil generally never comes out of a magnetic path formed between the plate top face and the pole top face. Thus, if a position of the pole top face is set to the state illustrated in FIG. 8A, when a large drive signal is input to the voice coil 512, an excellent response can be obtained.

In the case indicated in FIG. 8B, when the vibration unit 51 is at the standard position, the top end of the voice coil 512 generally never comes out of a magnetic path formed between the plate top face and the pole top face. Although in the case indicated in FIG. 8A, when the vibration unit 51 is at the standard position, there exists a magnetic flux which bypasses the voice coil, escaping upward, the case indicated in FIG. 8B has no such bypassing magnetic flux. Therefore, when the position of the pole top face is set to the state indicated in FIG. 8B, an excellent response is obtained when a vibration is started (when starting generation of sound).

In the case indicated in FIG. 8C, even when the deflection of the vibration unit 51 is maximum downward, the top end of the voice coil 512 generally never comes out of a magnetic path formed between the plate top face and the pole top face. Although in the case of FIG. 8B, when the vibration unit 51 descends below the standard position, there is generated a magnetic flux which bypasses the voice coil 512, escaping upward, the case of FIG. 8C has no such bypassing magnetic flux. Thus, when the position of the pole top face is set to the state indicated in FIG. 8C, a stable response can be obtained regardless of the magnitude of the amplitude.

If the height of the pole top face is higher than a height indicated in FIG. 8A, a magnetic flux which always bypasses the voice coil 512, escaping upward is generated regardless of the position of the vibration unit 51. Therefore, there is no advantageous factor. Further, if the height of the pole top face is lower than a height indicated in FIG. 8C, a magnetic flux is deviated downward. Consequently, drive force generated in the vibration unit 51 becomes asymmetrical in the vertical direction and thus, there is no advantageous factor. Therefore, it is desirable that the height of the pole top face is lower than a position of the top end of the voice coil 512 in a state where the vibration unit 51 is deviated upward by the maximum deflection amount sw and higher than the height of the plate top face.

The aforementioned construction of the yoke-holding unit (namely, main body) 52 is summarized as follows. The yoke-holding unit (main body) 52 comprises the yoke (a first yoke) 521 is formed of a ring-shaped soft magnetic material and disposed on an upper surface of the magnet 522 and the yoke (a second yoke) 523 is formed of a soft magnetic material. Here, it should be noted that an upside of the yoke-holding unit (main body) 52 or magnet 522 refers to a side near to the soundboard 7, even if the yoke-holding unit (main body) 52 or magnet 522 will be arranged in any direction. The second yoke 523 comprises a disk-shaped base unit configured to receive an underside surface of the magnet 522 on an upper surface of the base unit and the pole (a cylindrical pole) extending upwardly from a center portion of the base unit in such a manner that the pole is accommodated in an inner hollow portion of the magnet 522, the magnetic path space 525 is formed between an inside surface of the first yoke 521 and an outside surface of the pole, the vibration member 51 is vibrated along a longitudinal direction of the pole, and a position in the longitudinal direction of an upper end of the pole is determined so that the position is equal to or higher than a position an upper surface of the first yoke 521 and equal to or lower than a position of a top end of the voice coil where the vibration member 51 has been moved upward by the maximum deflection amount sw.

[Construction of Control Device 10]

Figure 9:
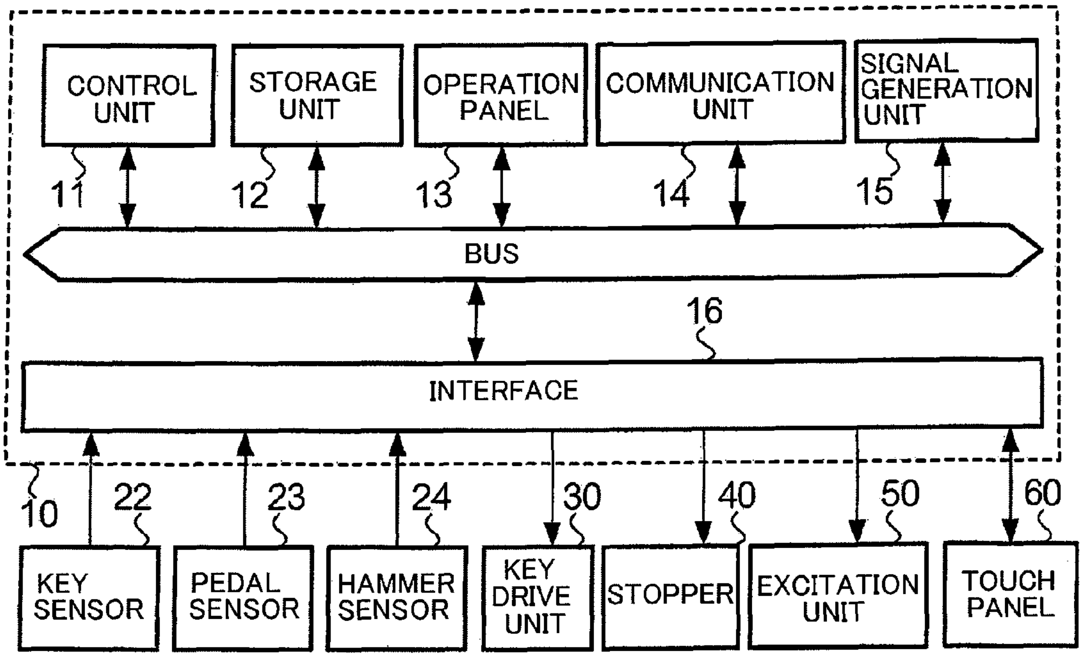
FIG. 9 is a block diagram showing a construction of a controller in the grand piano according to the embodiment.

FIG. 9 is a block diagram showing a construction of the control device 10 in the instant embodiment of the invention. The control device 10 includes a control unit 11, a storage unit 12, an operation panel 13, a communication unit 14, a signal generation unit 15, and an interface 16, and these components are interconnected via a bus.

The control unit 11 includes an arithmetic unit such as central processing unit (CPU), and the storage unit 12 includes a read-only memory (ROM), a random access memory (RAM), etc. The control unit 11 controls the various components of the s control device 10 and various components connected to the interface 16 on the basis of a control program stored in the storage unit 12. In the illustrated example, the control unit 11 causes the control device 10 and some of the components connected to the control device 10 to function as the keyboard instrument, by executing the control program.

The storage unit 12 stores therein setting information indicative of various settings for use during execution of the control program. The setting information is information for determining, on the basis of detection signals output from the key sensor 22, pedal sensor 23 and hammer sensor 24, content of the drive signal (audio waveform signal) to be generated by the signal generation unit 15. The setting information includes information indicating sound generation mode and performance mode, which are set by the user.

The operation panel 13 includes, among other things, operation buttons operable by the user, i.e. capable of receiving user's operations. Once a user's operation is received via any one of the operation buttons on the operation panel 13, an operation signal corresponding to the user's operation is output to the control unit 11. A touch panel 60 connected to the interface 16 includes a display screen, such as a liquid crystal display, and touch sensors for receiving user's operations are provided on a display section of the display screen. On the display screen are displayed, under control of the control unit 11 via the above-mentioned interface 16, various kinds of information such as a setting change screen for changing the content of the setting information stored in the storage unit 12, a setting screen for setting any one of various modes and the like, and various information, such as a musical score. The touch panel 60 provides an operation screen of a user interface for receiving a user's input. Once a user's operation is received via the touch sensor, an operation signal corresponding to the user's operation is output to the control unit 11 via the interface 16. User's instructions to the control device 10 are input through user's operations received via operations devices, including the operation panel 13, touch panel 60 etc., and user interface associated with the operations devices.

The communication unit 14 is an interface for performing communication with other devices in a wired and/or wireless fashion. To this interface may be connected a disk drive that reads out various data recorded on a storage medium, such as a DVD (Digital Versatile Disk) or CD (Compact Disk). Examples of data input to the control device 10 via the communication unit 14 include music piece data for use in an automatic performance.

Figure 10:
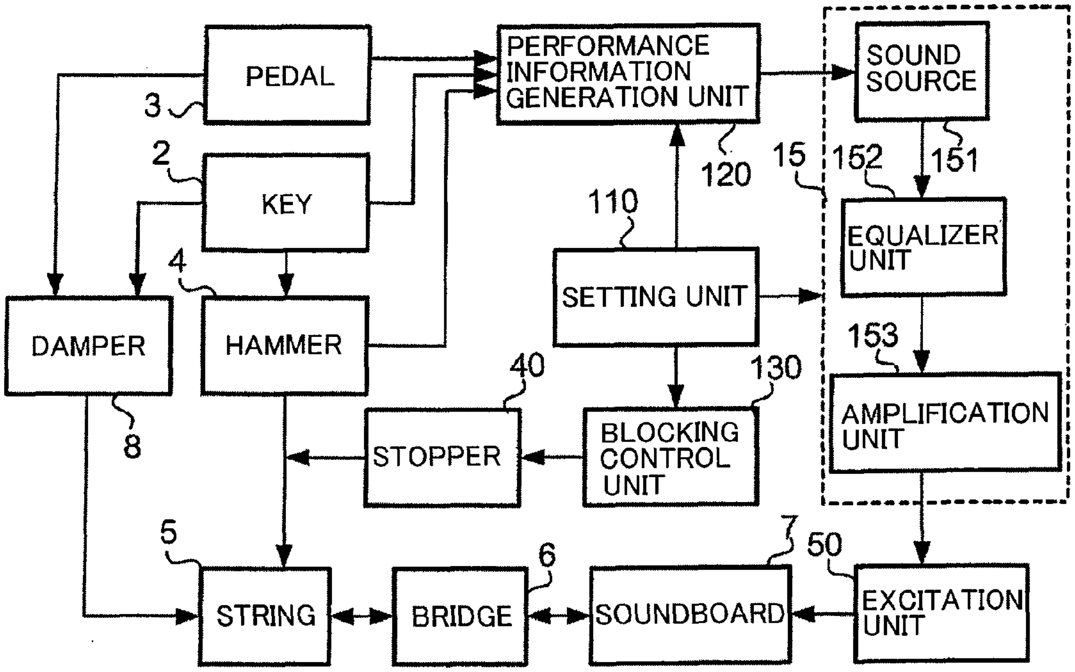
FIG. 10 is a block diagram showing a functional construction of the grand piano according to the embodiment.

The signal generation unit 15 includes a sound source 151 configured to output an audio waveform signal, an equalizer unit 152 configured to adjust the frequency characteristics of the audio waveform signal, and an amplifying unit 153 configured to amplify the audio waveform signal (see FIG. 10). After the frequency characteristics are adjusted and the audio waveform signal is amplified, the signal generation unit 15 outputs the audio waveform signal as the drive signal.

The interface 16 is an interface that interconnects the control device 10 and individual external components. Examples of the components connected to the interface 16 include the key sensor 22, pedal sensor 23, hammer sensor 24, key drive unit 30, stopper 40, excitation unit 50 and touch panel 60. The interface 16 supplies the control unit 11 with detection signals output from the key sensor 22, pedal sensor 23 and hammer sensor 24 and operation signals output from the touch panel 60. Further, the interface 16 supplies the key drive unit 30 and stopper 40 with a control signal output from the control unit 11, and it supplies the excitation unit 50 with the audio waveform signal output from the signal generation unit 15.

The following describe the acoustic grand piano 1 whose functions are implemented by the control unit 11 executing the control program.

[Functional Construction of Grand Piano 1]

FIG. 10 is a block diagram showing a functional construction of the grand piano 1 according to the embodiment of the present invention. As illustrated in FIG. 10, when the key 2 is operated, the hammer 4 strikes the string 5 so that the string 5 is vibrated. This vibration is propagated to the soundboard 7 through the bridge 6. The damper 8 is actuated when the key 2 or the pedal 3 is operated. Due to the action of the damper 8, a prevention condition of the vibration of the string 5 is switched.

A setting unit 110 is realized by a combination of the touch panel 60 and the control unit 11, as a configuration having a function described below. First, the touch panel 60 receives a user's operation for setting a desired sound generation mode. The control unit 11 changes setting information in response to a performance mode and a sound generation mode set by the user, and in response to these modes, outputs a control signal indicating the selected sound generation mode to a performance information generation unit 120 and a prevention control unit 130.

The touch panel 60 receives a user's operation for setting various control parameters for the signal generation unit 15. The various control parameters include parameters which determine a tone color of a sound represented by the audio waveform signal output from the sound source 151, an adjustment condition of the frequency characteristics in the equalizer unit 152, and an amplification factor of the amplification unit 153.

Each of the control parameters may be set by the user individually, or alternatively, a plurality sets of the control parameters may be previously stored in the storage unit 12 so that the user can select a desired one set from the stored sets and thus the control parameters corresponding to the selected set are set. The control unit 11 changes the setting information corresponding to each control parameter set by a user and controls the drive signal to be generated by the signal generation unit 15 according to the control parameter. Alternatively, the equalizer unit 152 and the amplification unit 153 may be configured to use only previously set control parameters while the change of the parameters through the control unit 11 is prevented.

The performance information generation unit 120 is realized, as a configuration having a function described below, by a combination of the control unit 11, the key sensor 22, the pedal sensor 23 and the hammer sensor 24. Behaviors of the key 2, the pedal 3 and the hammer 4 are detected by the key sensor 22, the pedal sensor 23, and the hammer sensor 24. Based on a resultant detection signal output, the control unit 11 specifies the string-striking time point at which the hammer 4 has struck the string 5 (i.e., key-on event time point), the key number identifying the operated key 2 corresponding to the struck string 5, the striking velocity, and the vibration-suppressing time point (key-off event time point) at which the damper 8 has suppressed vibration of the string 5, as information (performance information) for use in the sound source 151. In the illustrated example, the control unit 11 specifies the string-striking time point and the key number of the operated key 2 with reference to the behavior of the key 2. Then, the striking velocity is specified with reference to the behavior of the hammer 4, and the vibration-suppressing time point is specified with reference to the behavior of the key 2 and the pedal 3. It should be noted that the string-striking time point may be specified according to the behavior of the hammer 4 and the striking velocity may be specified according to the behavior of the key 2. The performance information may be information formulated by musical instrument digital interface (MIDI) type control parameter.

At the specified key-on event time point, the control unit 11 outputs performance information indicative of the key number, the velocity and the key-on event to the sound source 151. At the key-off event time point, the control unit 11 outputs performance information indicative of the key number and the key-off event to the sound source 151. When the sound generation mode set by the user is the sound damping mode or the sound intensifying mode (i.e., special sound generation mode), the control unit 11 realizes the above-described function, and when it is the normal sound generation mode, in the illustrated example, the control unit 11 refrains from outputting performance information to the sound source 151. It should be noted that when the normal sound generation mode is selected, it is just necessary to prevent the signal generation unit 15 from generating and outputting any drive signal. Thus, even in a configuration for generating and outputting the performance information, the control unit 11 only has to control the signal generation unit 15 not to generate and output any drive signal.

The prevention control unit 130 is realized by the control unit 11 so that the control unit 11 is configured to perform such a prevention control function (namely, a function of the prevention control unit 130) as mentioned below. When a sound generation mode selected by the user is the sound damping mode, the control unit 11 moves the stopper 40 to a position for blocking the hammer 4 to strike the string 5(namely, the blocking or preventing of the hammer 4 striking on the string 5 is permitted), and when the normal sound generation mode or the sound intensifying mode is selected, the control unit 11 moves the stopper 40 to a position where the striking of the string 5 by the hammer 4 is not blocked (namely, the blocking or preventing of the hammer 4 striking on the string 5 is not permitted).

The sound source 151 generates the audio waveform signal based on the performance information generated from the performance information generation unit 120 (control unit 11). For example, the sound source 151 generates the audio waveform signal having a tone pitch corresponding to thekey number and a sound volume corresponding to the velocity. The audio waveform signal is adjusted in accordance with frequency characteristics in the equalizer unit 152 and amplified by the amplification unit 153, and then the amplified signal is supplied to the excitation unit 50 as the drive signal. As described above, the excitation unit 50 vibrates in response to the supplied drive signal to vibrate the soundboard 7. Additionally, the vibration of the soundboard 7 is propagated to the bridge 6 and then to the string 5 through the bridge 6. In this way, by generating the audio waveform signal having the tone pitch (frequency) corresponding to the key number of the operated key for performance, the vibration sound generated from the soundboard 7 (i.e., the actively-vibrated-soundboard sound) which vibrates according to this audio waveform signal (drive signal) becomes to have a sound pitch corresponding to the sound pitch of the operated key. Furthermore, it is available to perform a velocity control (sound volume control responsive to a key touch) on the vibration sound from the soundboard 7. However, the frequency of the audio waveform signal (drive signal) can be changed in various ways not limited to the illustrated example. For example, it is possible to generate a mixed signal by mixing audio waveform signals each having different tone pitches like chord tones and then vibrate the soundboard 7 using the mixed signal as the drive signal.

Figure 11:
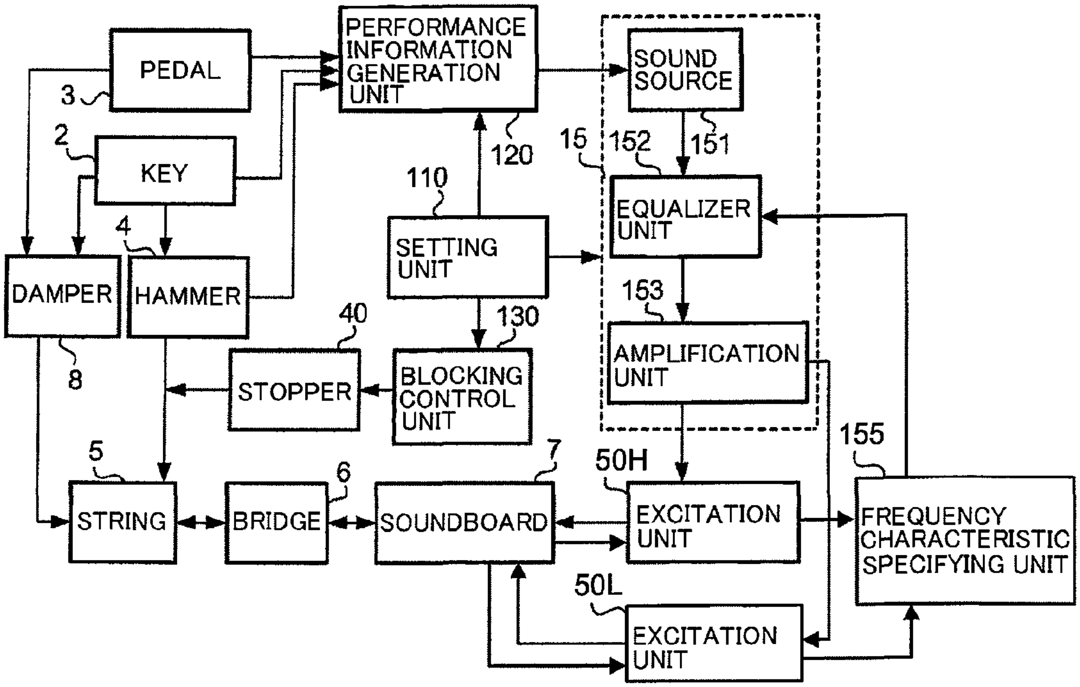
FIG. 11 is a block diagram showing a modification of the functional construction shown in FIG. 10.

FIG. 11 illustrates a modification of the embodiment illustrated in FIG. 10 in case where two excitation units 50H, 50L are used. FIG. 11 is the same as FIG. 10 except that two excitation units 50H, 50L are provided and frequency characteristics specifying unit 155 is added.

In the example illustrated in FIG. 11, the sound source 151 outputs an audio waveform signal (hereinafter referred to as audio waveform signal H) for use as the drive signal (hereinafter referred to as drive signal H) to be input to the excitation unit 50H, and an audio waveform signal (hereinafter referred to as audio waveform signal L) for use as a drive signal (hereinafter referred to as a drive signal L) to be input to the excitation unit 50L, via two different systems.

The audio waveform signal H and the audio waveform signal L may be of the same signal or different from each other. For example, the audio waveform signal H and the audio waveform signal L may be different from each other in terms of a frequency band. For example, the frequency band of the audio waveform signal H may be higher than that of the audio waveform signal L. Further, each channel of a plurality of channels such as right and left channels of stereo may be allocated to any one of the audio waveform signals H, L.

In the example illustrated in FIG. 11, the equalizer unit 152 adjusts the frequency characteristics of the audio waveform signal H and the audio waveform signal L respectively and outputs their results. The adjustment condition of the frequency characteristics with respect to the audio waveform signal H is specified by the frequency characteristic specifying unit 155 corresponding to the vibration characteristics of the soundboard 7 at a connection position (hereinafter referred to connection position H) of the vibration member 51 to the soundboard 7, included in the excitation unit 50H. Further, the adjustment condition of the frequency characteristics with respect to the audio waveform signal L is specified by the frequency characteristic specifying unit 155 corresponding to the vibration characteristics of the soundboard 7 at a connection position (hereinafter referred to as connection position L) of the vibration member 51 to the soundboard 7, included in the excitation unit 50L. An example of the adjustment condition of the frequency characteristics will be described with reference to FIGS. 12A and 12B.

Figure 12A:
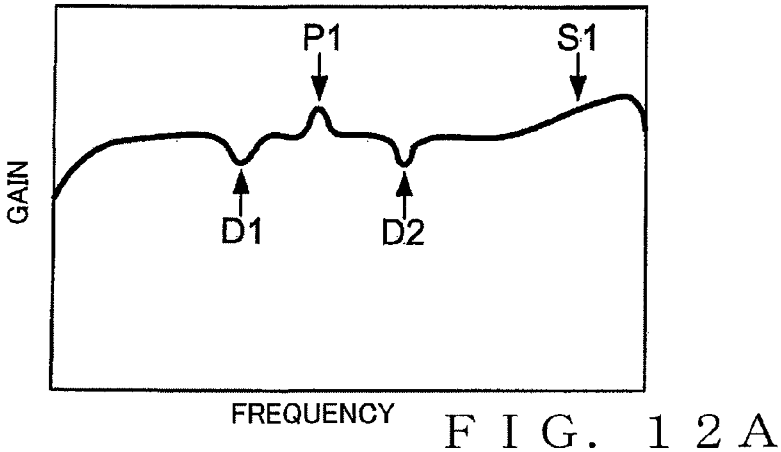
FIGS. 12A and 12B are graphs illustrating an adjustment of frequency characteristics to be set in an equalizer unit in the grand piano according to the embodiment.
Figure 12B:
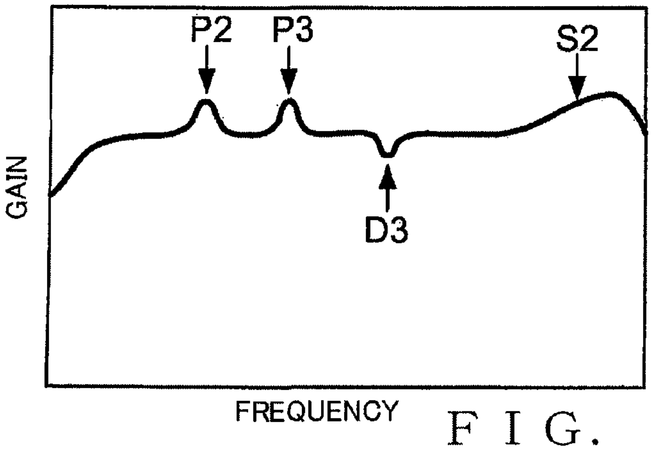

FIGS. 12A and 12B are graphs illustrating an adjustment condition of frequency characteristics in the equalizer unit 152. FIG. 12A illustrates the adjustment condition of the frequency characteristics (hereinafter referred to as frequency characteristics H) with respect to the audio waveform signal H in the equalizer unit 152, and FIG. 12B illustrates the adjustment condition of the frequency characteristics (hereinafter referred to as frequency characteristics L) with respect to the audio waveform signal L in the equalizer unit 152.

The frequency characteristics H is determined in inverse relation to vibration characteristics of the soundboard 7 at a connection position of the vibration member 51 of the excitation unit 50H to the soundboard 7 in such a manner that so as to suppress levels at frequency bands of the frequency characteristics H corresponding to resonance frequency bands of under a the vibration characteristics of the soundboard 7 are suppressed to thereby prevent the volume of the actively-vibrated-soundboard sound from increasing at the frequency bands corresponding to the resonance frequency bands, but levels at frequency bands of the frequency characteristics H corresponding to dip frequency bands of the vibration characteristics of the soundboard 7 are enhanced to thereby prevent the volume of the actively-vibrated-soundboard sound from decreasing at the frequency bands corresponding to the dip frequency bands. In the example as shown in FIG. 12A, frequency bands of dips D1, D2 in the frequency characteristics H correspond to frequency bands of resonance peaks in the vibration characteristics of the soundboard 7 at the connection position. Also, a frequency band of peak P1 in the frequency characteristics H corresponds to a frequency band of a dip in the vibration characteristics of the soundboard 7 at the connection position. It should be noted that the frequency characteristics H is not necessarily determined in completely inverse relation to vibration characteristics of the soundboard 7 at the connection position of the vibration member 51. For example, any one of such dips D1, D2 and peak P1 may not exist in the frequency characteristic H in FIG. 12A.

Further, in the exemplary frequency characteristics H as shown in FIG. 12A, in order to address a demerit that a high-frequency characteristic of excitation by the excitation unit 50 drops due to an influence of inductance of the voice coil 512, a gain-enhanced area S1 where a gain in a high frequency band of the frequency characteristics H is increased is defined. It should be noted that such the gain-enhanced area S1 may be omitted.

In this way, the audio waveform signal H has the frequency characteristics H in which amplitude level components at the frequency bands corresponding to the resonance peaks of the vibration characteristics of the soundboard 7 are suppressed by provision of the dips D1, D2, amplitude level components at the frequency band corresponding to the dip of the vibration characteristics of the soundboard 7 are enhanced by provision of the peak P1 to thereby prevent from being reduced in volume, and amplitude level components at the high frequency band are enhanced so that the influence of inductance of the voice coil 512 is suppressed. The audio waveform signal H is amplified by the amplification unit 153, and then the amplified signal is supplied to the excitation unit 50H as a drive signal H. As a result, the drive signal H is supplied to the excitation unit 50H as a signal having frequency characteristics determined in such a manner as to suppress influences of resonance peaks and dips of the soundboard 7 at the connection position H. Further, if the gain-enhanced area S1 is set in the frequency characteristics H, the reduction of amplitude level components in the high frequency band due to an influence of inductance of the voice coil 512 can be compensated.

On the other hand, in the similar manner as mentioned above, the frequency characteristics L is determined in inverse relation to vibration characteristics of the soundboard 7 at a connection position of the vibration member 51 of the excitation unit 50L to the soundboard 7. Namely, levels at frequency bands of the frequency characteristics L corresponding to resonance frequency bands of the vibration characteristics of the soundboard 7 are suppressed to thereby prevent the volume of the actively-vibrated-soundboard sound from increasing at the frequency bands corresponding to the resonance frequency bands, but levels at frequency bands of the frequency characteristics L corresponding to dip frequency bands of the vibration characteristics of the soundboard 7 are enhanced to thereby prevent the volume of the actively-vibrated-soundboard sound from decreasing at the frequency bands corresponding to the dip frequency bands. In this example, the frequency band of dip D3 in the frequency characteristics L corresponds to a frequency band of a resonance peak in the vibration characteristics of the soundboard 7 at the connection position. Also, the frequency bands of peaks P1, P3 in the frequency characteristics L correspond to frequency bands of dips in the vibration characteristics of the soundboard 7 at the connection position. It should be noted that the frequency characteristics L is not necessarily determined in completely inverse relation to vibration characteristics of the soundboard 7 at the connection position of the vibration member 51. For example, any one of such a dip D3 and peaks P2, P3 may not exist in the frequency characteristic L in FIG. 12B.

As same as mentioned above, in the exemplary frequency characteristics L as shown in FIG. 12B, in order to address to the demerit that the high-frequency characteristic of excitation by the excitation unit 50 drops due to the influence of inductance of the voice coil 512, a gain-enhanced area S2 where a gain in a high frequency band of the frequency characteristics L is increased is defined. Also, the gain-enhanced area S2 can be omitted.

In this way, the audio waveform signal L has the frequency characteristics L in which amplitude level components at the frequency band corresponding to the resonance peak of the vibration characteristics of the soundboard 7 are suppressed by provision of the dip D3, amplitude level components at the frequency bands corresponding to the dips of the vibration characteristics of the soundboard 7 are enhanced by provision of the peaks P2, P3 to thereby prevent from being reduced in volume, and amplitude level components at the high frequency band are enhanced so that the influence of inductance of the voice coil 512 is suppressed. The audio waveform signal L is amplified by the amplification unit 153, and then the amplified signal is supplied to the excitation unit 50L as a drive signal L. As a result, the drive signal L is supplied to the excitation unit 50L as a signal having frequency characteristics determined in such a manner as to suppress influences of resonance peaks and dips of the soundboard 7 at the connection position L. Further, if the gain-enhanced area S2 is set in the frequency characteristics L, the reduction of amplitude level components in the high frequency band due to an influence of inductance of the voice coil 512 can be compensated.

In FIG. 11, the amplification unit 153 may amplify each of the audio waveform signals H, L with the same amplification factor or with a different amplification factor from each other. The excitation units 50H, 50L vibrate according to the drive signals H, L supplied thereto respectively so that the soundboard 7 is vibrated. The vibration of the soundboard 7 is propagated to the bridge 6 and then to the string 5 through the bridge 6.

Figure 13:
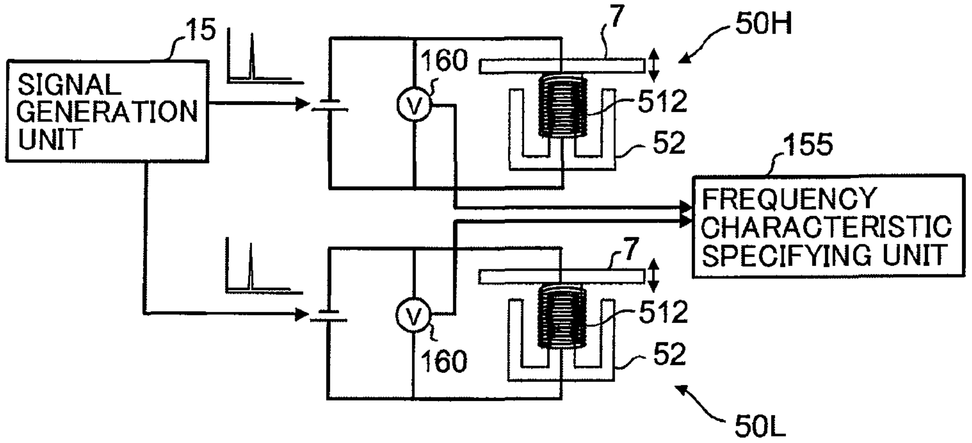
FIG. 13 is a diagram showing a mechanism in which a frequency characteristics specifying section unit specifies the frequency characteristics to be set in the equalizer unit.

The frequency characteristic specifying units 155 specifies the frequency characteristics H and the frequency characteristics L, which are to be adjusted by the equalizer unit 152, with respect to the drive signal H and the drive signal L. FIG. 13 is a diagram illustrating a mechanism in which the frequency characteristic specifying portion 155 specifies the frequency characteristics H and the frequency characteristics L.

For example, prior to shipping the grand piano 1 as an individual product, a personnel in charge of product adjustment makes a specified operation of instructing a specific processing about the frequency characteristics with the touch panel 60 provided on the same grand piano 1, the signal generation unit 15 outputs an impulse signal to the excitation unit 50H as a drive signal. The voice coil 512 of the excitation unit 50H is driven strongly in an extremely short period by the impulse signal input from the signal generation unit 15, so that the soundboard 7 is vibrated via the connecting member 511. After the soundboard 7 is excited, the soundboard 7 is vibrated like when it is struck by one time with a hard object at the arrangement position of the excitation unit 50H.

When the soundboard 7 is vibrated, the voice coil 512 is also vibrated in response to the vibration of the soundboard 7. When the voice coil 512 arranged in the magnetic path formed by the yoke-holding unit 52 is vibrated, an electromotive force is generated between both ends of the voice coil 512. To measure the value of a voltage generated by this electromotive force, a voltmeter 160 is connected between the both ends of the voice coil 512. The voltmeter 160 outputs the value of voltage between the both ends of the voice coil 512 generated by a vibration of the soundboard 7, to the frequency characteristic specifying unit 155.

The frequency characteristic specifying unit 155 records voltage values input sequentially from the voltmeter 160 and then, specifies the frequency characteristics of waveforms (waveforms corresponding to vibration of the soundboard 7) indicated by a variation with time of the recorded voltage values by using a known method such as a Fourier transformation. Such the specified frequency characteristics indicate the vibration characteristics of the soundboard 7 at a position where the excitation unit 50H is connected to (connection position H). In response to such the specified frequency characteristics at the connection position H of the soundboard 7, the frequency characteristic specifying unit 155 specifies (or determines) the frequency characteristics H for adjusting the drive signal to be output from the equalizer unit 152 to the excitation unit 50H in such a manner as to increase the amplitudes of frequency components in the frequency band corresponding to the dip and suppress the amplitudes of frequency components in the frequency band corresponding to the peak.

Subsequently, the signal output unit 15 outputs an impulse signal to the excitation unit 50L as the drive signal. After that, the same processing as the processing applied to the excitation unit 50H as described above is carried out as to the excitation unit 50L. As a result, the frequency characteristic specifying unit 155 specifies (or determines) the frequency characteristics L for adjusting a drive signal to be output to the excitation unit 50L by the equalizer unit 152. The specified frequency characteristics H, L are set in the equalizer unit 152.

[Example Behavior]

Next, a description will be given about example behavior of the grand piano 1 employing the instant embodiment. First, the user operates the touch panel 60 to set the performance mode as the normal performance mode and the sound generation mode as the sound damping mode. Under this condition, when the user operates the key 2 for a musical performance, a strike of the hammer 4 against the string 5 is blocked and the soundboard 7 is vibrated by the excitation unit 50 so that the actively-vibrated-soundboard sound is radiated from the soundboard 7. Further, the bridge 6 is also vibrated via the soundboard 7, so that other strings 5 than those prevented from being vibrated by the damper 8 are also vibrated to generate a sound similar to the acoustic piano. Because a strike of the hammer 4 against the string 5 is blocked, no sound is generated by striking the string 5. Therefore, it is possible to generate a sound using the vibration of the soundboard 7 and the acoustic effect due to the resonance of the strings like an acoustic piano with a smaller sound volume (or a larger sound volume) than a sound generated by striking the string, by means of adjusting the amplitude of vibration of the excitation unit 50. Further, because the length of the voice coil 512 is determined to be lower than the sum of the magnetic path width mw and the double of the maximum deflection amount sw, responsiveness in the high frequency region can be improved while securing the drive force for vibrating the soundboard 7 effectively.

As described above, the excitation unit 50H excites the soundboard 7 using the drive signal H having the frequency characteristics set to suppress influences of the resonance peaks and dips of the soundboard 7 at the connection position H. Also, the excitation unit 50L vibrates the soundboard 7 using the drive signal L having the frequency characteristics set to suppress influences of the resonance peaks and dips of the soundboard 7 at the connection position L. Thus, In the keyboard instrument (grand piano 1) having the excitation unit 50 mounted on the soundboard 7, influence on a quality of the sound generated by the keyboard instrument due to the resonance of the soundboard 7 can be controlled so that a sound having an unexpected quality can be never generated. Further, according to the above described embodiments, it is capable of generating a sound having relatively flat frequency characteristics over an entire audio frequency range. Further more, according to the above described embodiments, it is not necessary to use such an ordinary speaker for driving the soundboard 7 that generates a sound by driving a cone paper. In this way, because a sound can be generated even only by exciting the soundboard, a sound generation mechanism of a conventional acoustic piano can be used effectively thereby obtaining a natural acoustic effect.

On the other hand, when the normal sound generation mode is selected by the user's operation of the touch panel 60, the excitation unit 50 refrains from vibrating and striking the string 5 by the hammer 4 is not prevented. Thus, a sound is generated in response to striking the string 5 and the vibration of the string 5 is transmitted to the soundboard 7 via the bridge 6. The soundboard 7 radiates a sound corresponding to the vibration transmitted from the string 5. In this condition, only a load of the vibration member 51, which is a very light component of the excitation unit 50, is applied to the soundboard 7. Thus, the excitation unit 50 hardly affects the vibration characteristics of the soundboard 7, so that the user can play the acoustic piano without impairing an original acoustic property of the acoustic piano.

When the sound intensifying mode is selected by the user's operation of the touch panel 60, excitation of the soundboard 7 by means of the excitation unit 50 and striking the string 5 by the hammer 4 are carried out at the same time in response to an operation of key 2. Thus, the soundboard 7 radiates a sound through vibration which is a sum of vibration propagated from the struck string 5 to the soundboard 7 via the bridge 6 and vibration of itself caused by the excitation unit 5. Upon struck by the hammer 4, the struck string 5 radiates the sound through vibration of itself and the other strings 5 which are not prevented by the damper 8 from vibrating are vibrated according to the propagated vibration form the soundboard 7 to these strings 5 via the bridge 6 to thereby produce a resonance sound. Consequently, the original sound of the acoustic piano and the actively-vibrated-soundboard sound generated via the soundboard 7 according to the audio waveform signal output from the sound source 151 are naturally mixed together to produce a performance sound corresponding to the mixed sound.

Whereas the preceding paragraphs have described a preferred embodiment of the present invention, the present invention can be practiced in various other manners as set forth below.

[Modification 1]

Whereas the preferred embodiment of the vibration member 51 (connecting member 511) is completely separated from the yoke-holding unit 52, the vibration member 51 may be connected indirectly with the yoke-holding unit 52 or casing 524.

Figure 14:
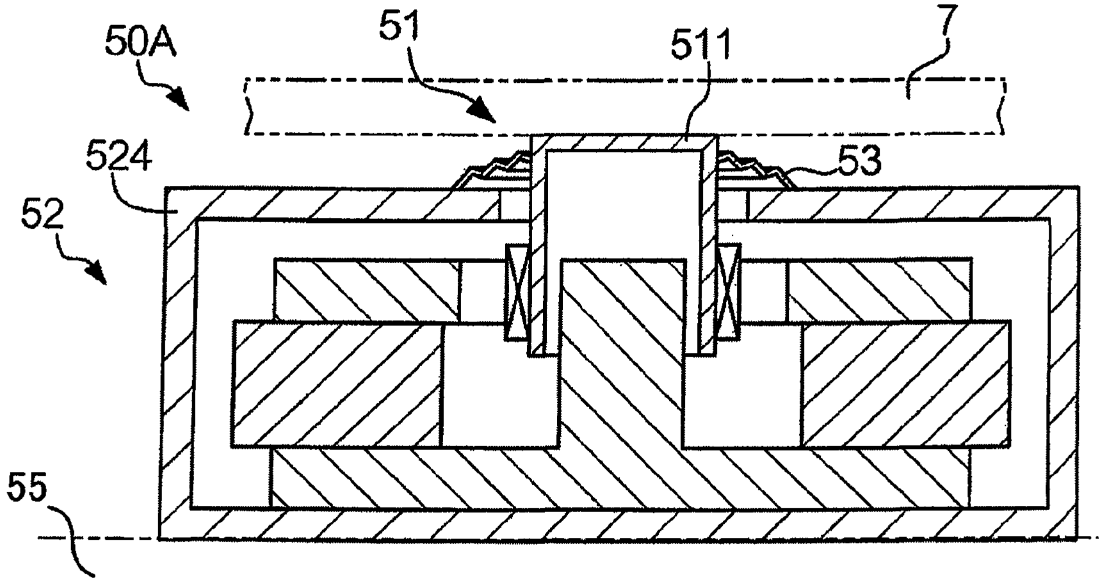
FIG. 14 is a cross-sectional view explanatory of the excitation unit according to modification 1 of the present invention.

FIG. 14 is a cross-sectional view of excitation unit 50A to which modification 2 of the present invention is applied. The excitation unit 50A in the illustrated example includes a damper unit 53 configured to connect the connecting member 511 with the casing 524. The damper unit 53 is expanded and contracted following a vertical vibration of the connecting member 511 from the standard position where the voice coil 512 is not driven by the drive signal and no force is applied to the soundboard 7 by the connecting member 511. In the illustrated example, in a condition that the connecting member 511 is not yet connected to the soundboard 7 and is kept supported by only the damper unit 53, a height of the supporting unit 55 for supporting the excitation unit 50A thereon is adjusted so that the top face of the connecting member 511 in the standard position is just in contact with the bottom face of the soundboard 7. Then, with this condition, the top face of the connecting member 511 is connected to the bottom face of the soundboard 7.

In this way, in the standard position, no weight of the excitation unit 50A is applied to the soundboard 7. The damper unit 53 is capable of supporting the light-weight vibration member 51 and highly stretchable. Therefore, when the soundboard 7 is vibrated, the weight of the yoke-holding unit 52 is hardly transmitted to the vibration member 51 due to the damper unit 53, and there is less or no influence on the vibration characteristics of the soundboard 7 accordingly. Further, because the connection between the vibration member 51 and the yoke-holding unit 52 is kept due to existence of the damper unit 53, it is facilitated for a human worker to connect the excitation unit 50 to the soundboard 7 during manufacturing steps.

[Modification 2]

Whereas the preferred embodiment of the grand piano 1 of the present invention has been described above as applied to a grand piano, it may be applied to an upright piano.

Figure 15:
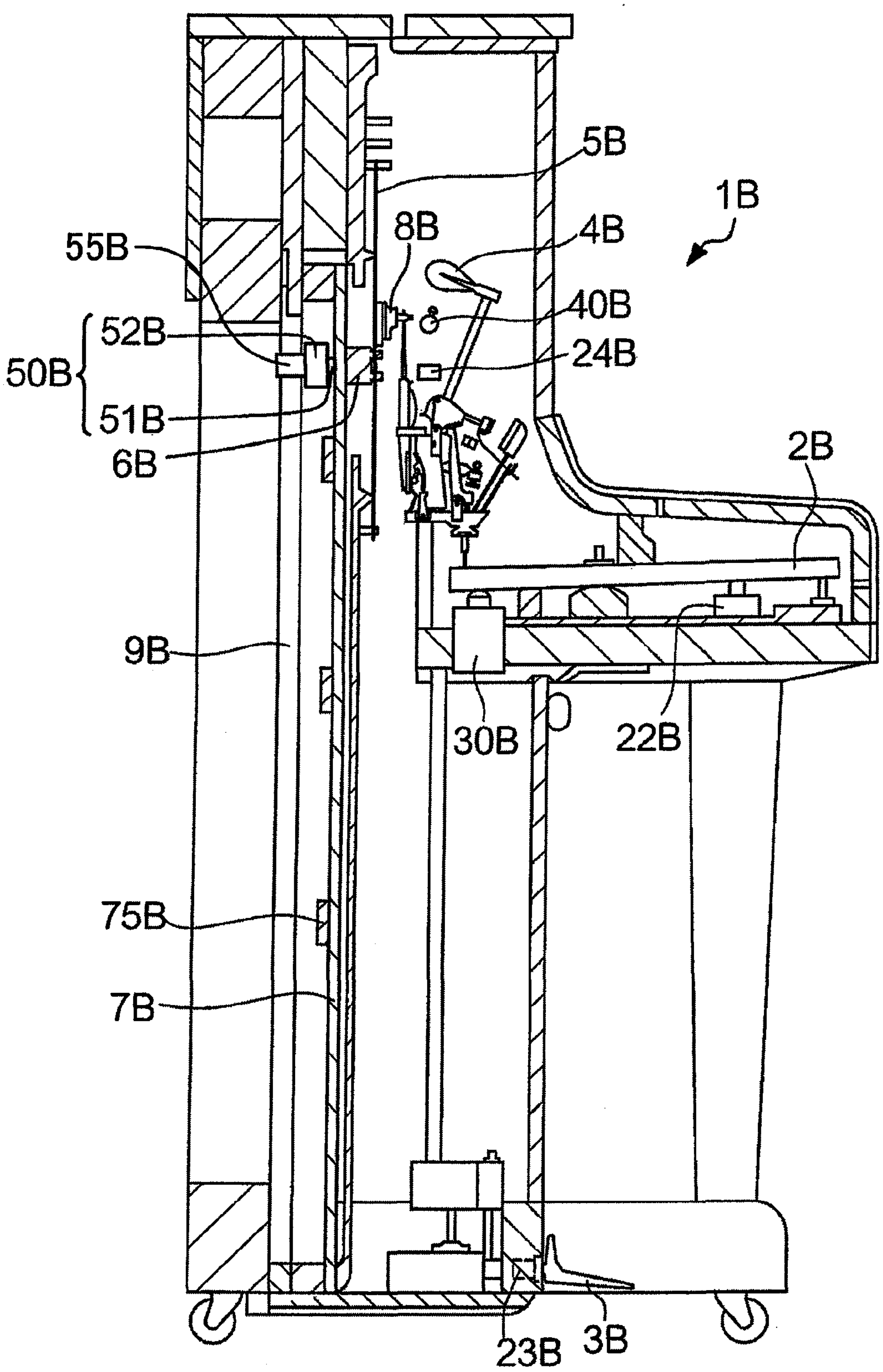
FIG. 15 is a view explanatory of an internal construction of an upright piano according to modification 2 of the present invention.

FIG. 15 is a view showing an inner construction of an upright piano 1B which employs modification 2 of the present invention is applied. In FIG. 15, elements of the upright piano 1B similar to the elements of the grand piano 1 are indicated by the same reference numerals as used for the grand piano 1 but each with suffix "B". In the upright piano 1B too, the vibration member 51B in then excitation unit 50B is connected to the soundboard 7B, and the yoke-holding unit 52B is supported by the supporting unit 55B connected to the straight supporting column 9B.

Figure 16:
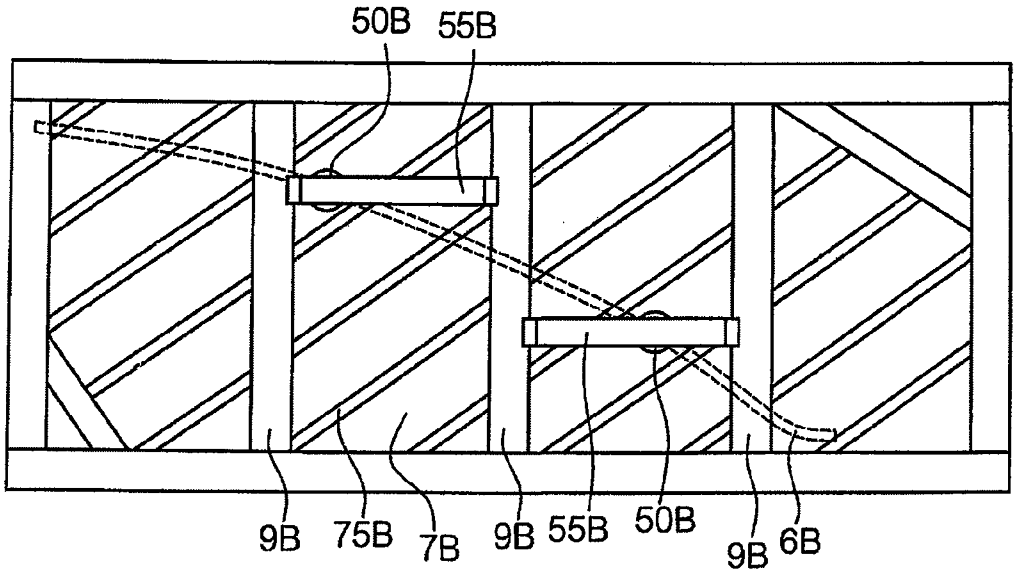
FIG. 16 is a view explanatory of an arrangement of the excitation unit in the upright piano according to modification 2.

FIG. 16 is a view explanatory of a positional arrangement of the excitation unit 50B according to the modification 2. In the illustrated example as well, the excitation unit 50B is connected to the soundboard 7B located between ribs 75B. The excitation unit 50B is provided in a position corresponding to the bridge 6B (in other words, back surface of the soundboard 7B at the position where the bridge 6B is mounted). Further, in the example illustrated in FIG. 16, although the supporting unit 55B is connected to a plurality of the straight supporting columns 9B, the supporting unit 55B may be connected to one straight supporting column 9B. Although the excitation unit 50B shown in FIG. 16 is provided on a position corresponding to a long bridge of the bridges 6B, the excitation unit 50B may be located at a position corresponding to a short bridge (not illustrated) of the bridges 6B. Further, the vibration units 50B may be provided on each position corresponding to the long bridge and the short bridge. With this arrangement, each one of the long and short bridges can be driven accurately and effectively with a desired vibration. Furthermore, there may be provided with one or more excitation units 50B at one or more suitable potions corresponding to each of the long and short bridges.

[Modification 3]

Whereas, in the above-described preferred embodiment, the excitation unit 50 is supported by the supporting unit 55 so that no load except the vibration member 51 is applied to the soundboard 7, other weight than the vibration member 51 may be applied to. For example, the supporting unit 55 may support the excitation unit 50 in a state in which it is connected to the soundboard 7. Alternatively, an excitation unit may be attached directly to the soundboard 7 without existence of the supporting unit 55. A case where no supporting unit 55 exists will be described with reference to FIG. 17.

Figure 17:
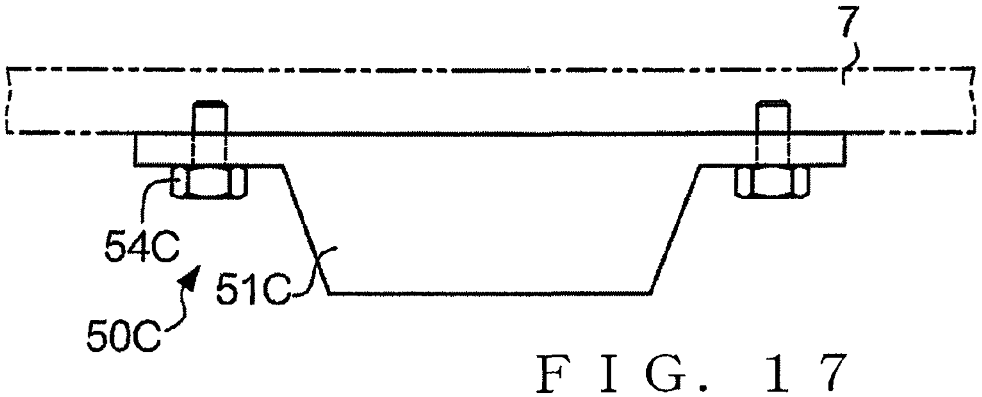
FIG. 17 is a side view showing a state in which the excitation unit is mounted onto a soundboard according to modification 3 of the present invention.

FIG. 17 is a side view showing a state in which an excitation unit 50C is directly mounted onto the soundboard 7 employing modification 3 of the present invention. The excitation unit 50C comprises a vibration member 51C and connecting members 54C. The vibration member 51C is connected to the soundboard 7 with the connecting member 54C such as a screw. The vibration member 51C contains a weight inside which is configured to be vibrated in response to the drive signal input to the vibration member 51C so that the soundboard 7 is vibrated by reaction of the vibration of the weight.

In this case, because a weight of the entire excitation unit 50C is applied to the soundboard 7, there is a possibility that the vibration characteristics of the soundboard 7 may be varied from preferable characteristics if no compensation is applied. In view of this point, according to the modification 3 of the present invention, the frequency characteristics of the drive signal is determined in such a manner as to compensate the varied vibration characteristics and reduce such an inconvenience. Further, in the modification 3, if the sound quality in the normal sound generation mode is changed from a sound quality in a case where no excitation unit 50C is attached due to the varied vibration characteristics, such a change in the sound quality can be eliminated by exciting the excitation unit 50C with a suitable drive signal in the normal sound generation mode so as to compensate the change in the sound quality. Alternatively, it may be configured in the modification 3 not to use the normal sound generation mode.

[Modification 4]

Whereas, in the above-described preferred embodiment, the drive signal has been obtained by adjusting the frequency characteristics of the audio waveform signal in the equalizer unit 152, the drive signal may be generated without adjusting through the equalizer unit 152. In this modification 4 of the present invention, the sound source 151 is configured to generate the audio waveform signal H (or audio waveform signal L) to have the preferable frequency characteristics corresponding to the drive signal H (or drive signal L). Then, the audio waveform signal H (or audio waveform signal L) may be amplified by the amplification unit 153 and output as the drive signal H (or drive signal L).

[Modification 5]

In the above-described embodiment, the drive signal H (or drive signal L) has frequency characteristics having dips and peaks at frequency positions corresponding to the resonance peaks and dips of the frequency characteristics of the soundboard 7 at the connection position H (or connection position L). However, the drive signal may be a signal having other frequency characteristics which are set so as to have further dips and/or peaks at other frequency positions than the resonance peaks and dips. If there are the further dips and/or the peaks at other frequency positions than the frequency positions of the resonance peaks and dips, generation of various sounds with a variety of tone colors can be achieved.

Various sets of the frequency characteristics each having a pattern of an appropriate combination of dips and peaks may be previously stored in the storage unit 12 so that the user can select a desired pattern to be set as the frequency characteristics of the drive signal by an operation of the touch panel 60 or the like. Further, it may be constructed in such a manner that the user determines a pattern of a preferable combination of dips and peaks to store the determined pattern in the storage unit 12 as a new template. It should be noted that the frequency characteristics of the drive signal H and the frequency characteristics of the drive signal L may be different from each other.

The drive signal is not limited to a signal set to suppress the resonance of the soundboard 7, it may be a signal having frequency characteristics set to emphasize the resonance. In this case, the drive signal should not be formed so that a dip exists in the frequency band corresponding to the resonance peak of the soundboard 7, but should be formed so that a peak exists in the frequency band corresponding to the resonance peak of the soundboard 7. Similarly, the drive signal may not be formed so that a peak exists in the frequency band corresponding to the dip of the soundboard 7, but may be formed so that a dip exists in the frequency band corresponding to the dip of the soundboard 7. In this connection, the frequency characteristics of the drive signal H may be set so that a dip exists in the frequency band corresponding to the resonance peak, while the frequency characteristics of the drive signal L may be set so that a peak exists in the frequency band corresponding to the resonance peak.

In this way, the drive signal to be input to each of a plurality of the excitation unit 50 may be any kind of signal as long as it is a signal having frequency characteristics associated with the vibration characteristics of the soundboard 7 in the position where the vibration member 51 included in the excitation unit 50 to be input thereto the drive signal is connected.

[Modification 6]

Whereas, in the above-described preferred embodiment, the frequency characteristics of the drive signal H (or drive signal L) is previously set so that the dip and the peak exists in the frequency band corresponding to the resonance peak and the dip of the soundboard 7 at the connection position H (connection position L), if a mounting position of the excitation unit 50H (excitation unit 50L) is changed, the frequency characteristics of the drive signal may be modified so that the frequency and magnitude of the dip and peak (hereinafter referred to setting parameter) may be changed. The setting parameter may be set by a user's operation of the touch panel 60 or the like. Alternatively, it may be constructed in such a manner that, in response to a user's instruction through the touch panel 60 or the like to designate a position of the excitation unit 50 to be mounted on the soundboard 7 (e.g., coordinate position on the soundboard 7), the control unit 11 calculates necessary setting parameters to be set based on the designated position and information indicative of the vibration characteristics of the soundboard 7 which is previously set (such information includes e.g., an arithmetic expression indicating a relationship between the designated coordinate position and the vibration characteristics).

[Modification 7]

Figure 18:
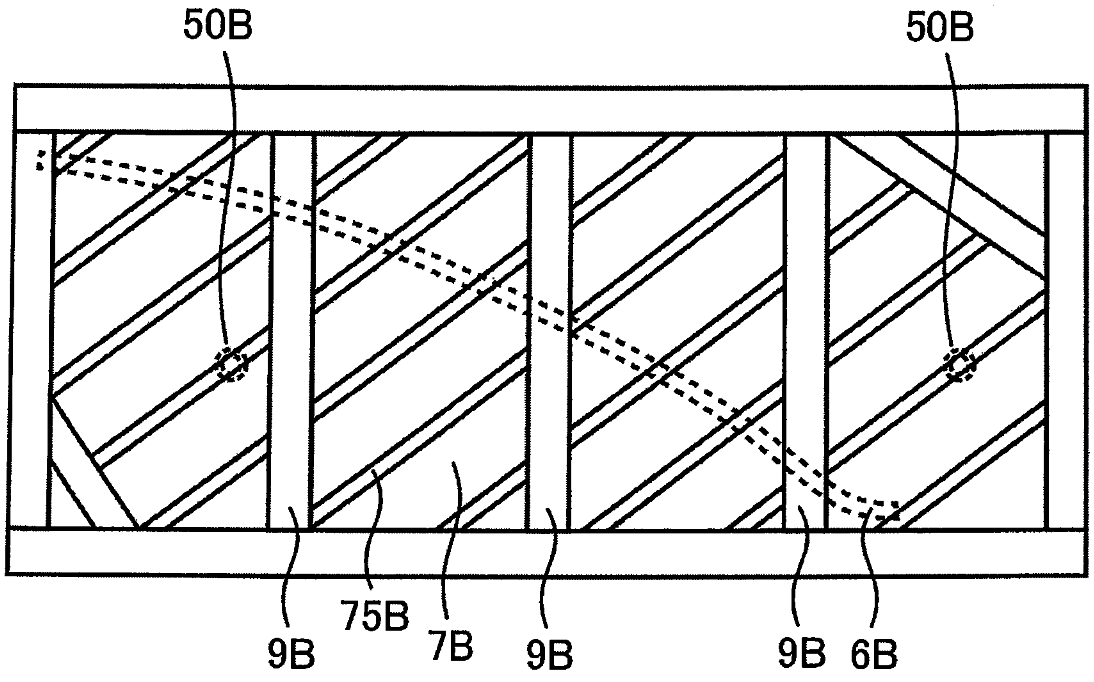
FIG. 18 is a view explanatory of an arrangement of the excitation unit according to modification 7 of the present invention.

Whereas, in the above-described preferred embodiment, the excitation unit is provided at a position corresponding to the bridge on the soundboard, the excitation unit may be provided at any position distanced from the bridge. FIG. 18 is a view explanatory of an arrangement of the excitation unit according to modification 7 of the present invention in which the upright piano according to the modification 2 shown in FIG. 15 is modified in such a manner that the excitation units 50B are arranged at positions distanced from the bridge 6B on the soundboard 7B. In the illustrated example of FIG. 18, two excitation units 50B are arranged at positions (rear face of the soundboard 7B in FIG. 18) opposing the ribs 75B across the soundboard 7B.

Figure 19:
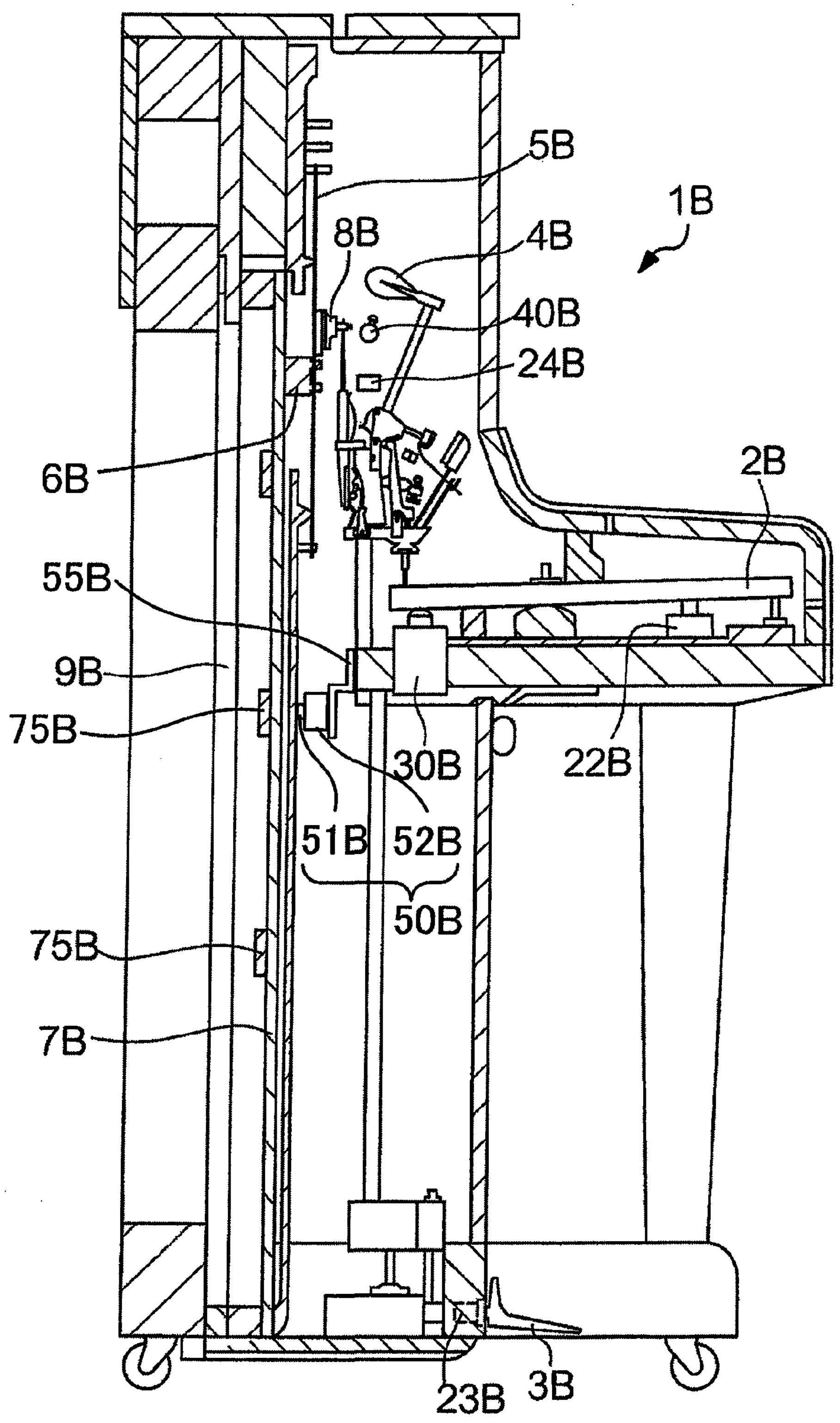
FIG. 19 is a view explanatory of an internal construction of the upright piano according to modification 7 of the present invention.

FIG. 19 is a view explanatory of an internal construction of the upright piano according to modification in which the excitation unit 50B as shown in FIG. 18 is supported by the supporting unit 55B. As shown in FIG. 19, the supporting unit 55B of the modification 7 has a two-angled shape formed by bending a plate, e.g., a stainless plate, by a right angle toward opposite directions at two different positions in a longitudinal direction respectively. A flat portion constituting one end portion of the supporting unit 55B is attached to the back face of a shelf plate 90 of the upright piano 1B by a screw or the like. The yoke-holding unit 52B of the excitation unit 50B is attached to another flat portion constituting another end portion of the supporting unit 55B. The yoke-holding unit 52B is disposed at a position opposing the rib 75B across the soundboard 7B and the yoke-holding unit 52B accommodates the vibration member 51B connected to the soundboard 7B at that position.

Even in the above-described configuration in which the excitation unit is connected to the soundboard at the position corresponding to not the bridge but the rib, the vibration caused by the excitation unit is propagated to the entire soundboard through the rib effectively, so that a desired radiation of a sound via the soundboard is achieved.

Further, it may be constructed in such a manner that there is provided with an excitation rod, which is a rod-like member different from the rib, on the front surface of the soundboard which is an opposite side to the rear surface of the soundboard where the rib is provided, and the excitation unit at a position opposing the excitation rod across the soundboard, namely on the rear surface of the soundboard. Because the excitation rod can be designed separately from an existing bridge or rib, it is desirable to adjust the shape, size, arrangement position and the like of the excitation rod so that a sound having desired audio characteristics is radiated in response to excitation by the excitation unit.

Furthermore, the excitation unit may be disposed at any position on the soundboard other than the position corresponding to the bridge, rib or excitation rod as described above, as long as a preferable vibration sound can be radiated from the disposed position on the soundboard.

[Modification 8]

Whereas, in the above-described preferred embodiment, the yoke-holding unit 52 is assumed to generate the magnetic field using the magnet 522 consisting of a permanent magnet, a construction such as an electromagnet capable of controlling generation of the magnetic field can be used instead of the permanent magnet so that the generation of the magnetic field can be stopped when the vibration member 51 should not be vibrated, e.g., in the normal sound generation mode.

[Modification 9]

Whereas, in the above-described preferred embodiment, the excitation unit 50 has the vibration member 51 and the yoke-holding unit 52, and is constructed in a configuration similar to dynamic type speaker using the voice coil, the configuration of the excitation unit of the present invention is not limited to the configuration similar to the dynamic type speaker. Any other configuration may be adopted such that the excitation unit has a main body and a vibration unit which is lighter than the main body, separated from the main body and connected to the soundboard and at least one of attraction force, and that repulsion force in response to the drive signal is generated between the main body and the vibration unit.

Figure 20:
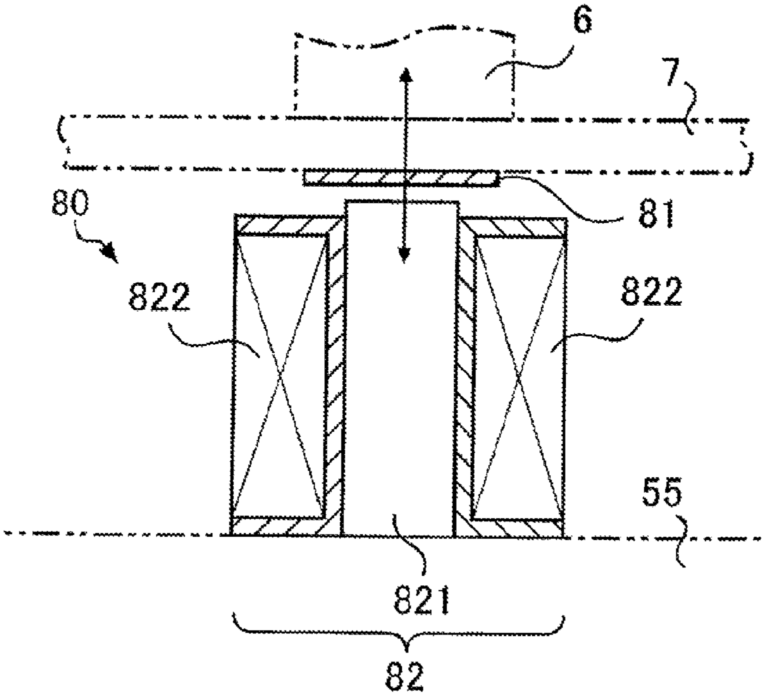
FIG. 20 is a cross-sectional view explanatory of an excitation unit according to modification 9 of the present invention.

FIG. 20 is a cross-sectional view explanatory of an excitation unit according to modification 9 of the present invention, in which the excitation unit is configured in a different way from the dynamic type speaker. An excitation unit 80 of the modification 9 comprises a magnetic sheet 81, as the vibration member, consisting of a sheet-like ferromagnetic material attached to the soundboard 7 and an electromagnet 82, as the main body, supported by the supporting unit 55. The electromagnet 82 comprises a core 821 made of a cylindrical magnetic material and a coil 822 wound around the core 821 and generates magnetic force whose intensity and polarity change according to the drive signal input from the control unit 10.

The magnetic sheet 81 causes the soundboard 7 to vibrate in accordance with attraction force and repulsion force produced by the magnetic force from the electromagnet 82. It is preferable that the magnetic sheet 81 is made of a ferromagnetic material from which not only attraction force produced in a direction approaching toward the electromagnet 82 but also repulsion force produced in a direction leaving from the electromagnet 82 can be obtained in response to the magnetic force generated from the electromagnet 82. However, the magnetic sheet 81 may be made of a paramagnet or a diamagnetic material rather than the ferromagnetic material. In this case, the soundboard 7 receives such a force only in one direction, that is, the direction toward the electromagnet 82 (in case of paramagnetic material) or the direction off the electromagnet 82 (in case of diamagnetic material) and when the soundboard receives the force from the magnetic sheet 81, it is moved from its steady-state position, and when the force from the magnetic sheet 81 is released, it is moved toward the steady-state position by a restoring force, thereby the soundboard is vibrated.

Of the excitation unit 80, only a weight of the light magnetic sheet 81 is applied to the soundboard 7 but the weight of the electromagnet 82, which occupies most weight of the excitation unit 80, is not applied to the soundboard 7. Thus, the excitation unit 80 hardly affects the vibration characteristic of the soundboard 7.

In summary, according to the modification 9, the vibration member is formed of the sheet-like magnetic material (81) attached to the soundboard 7, and the excitation unit includes the electromagnet (82) which is magnetically coupled with the sheet-like magnetic material via air gap and excited by the drive signal. The supporting unit 55 supports the electromagnet.

[Modification 10]

Whereas, in the above-described preferred embodiment, the supporting unit 55 supports the excitation unit 50 in a state in which the supporting unit 55 is connected to the straight supporting column 9, the supporting unit 55 may be connected to other than the straight supporting column 9. For example, the supporting unit 55 may support the excitation unit 50 in a state in which the supporting unit 55 is connected to a side plate or leg of the grand piano 1. Further, the supporting unit 55 may support the excitation unit 50 in a state in which the supporting unit 55 is connected to a construction (e.g., floor, wall) of a room where the grand piano 1 is placed.

Although the supporting unit 55 supports the excitation unit 50 such that no load except the vibration member 51 is applied to the soundboard 7, other weight than the vibration member 51 may be applied thereto. For example, the connecting member 511 of the excitation unit 50A of the modification 1 may be urged upward or downward by the damper unit 53 in a state in which the soundboard 7 is not being vibrated.

[Modification 11]

The control program of the above-described embodiment may be provided in a state in which the control program is stored in a computer readable recording medium such as a magnetic recording medium (magnetic tape, magnetic disk), an optical recording medium (optic disk), a magnet-optical recording medium, and a semiconductor memory. Further, for the grand piano 1, the control program may be downloaded via a network.

[Modification 12]

Figure 21:
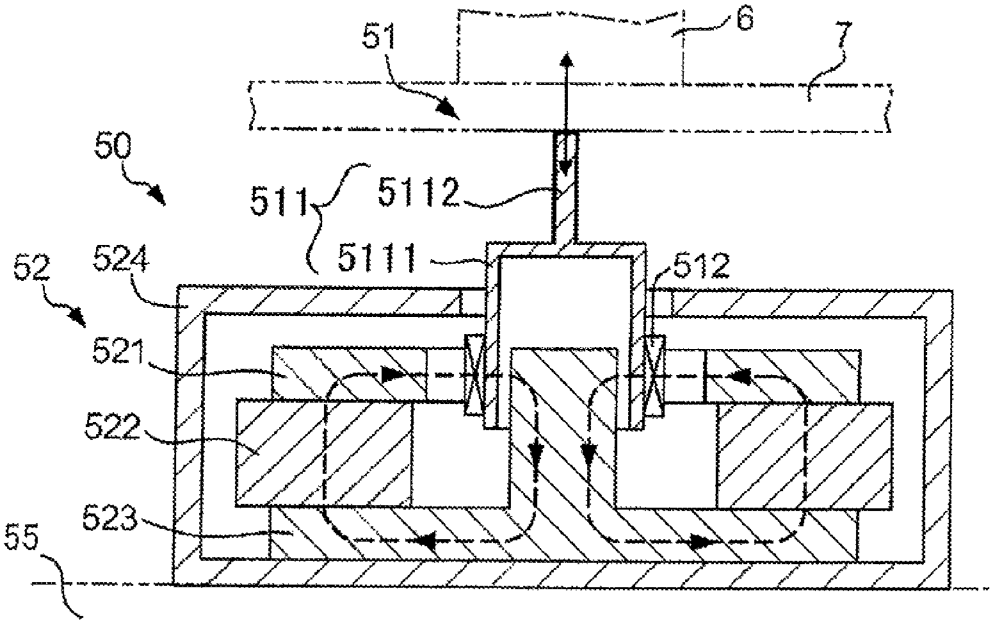
FIG. 21 is a cross-sectional view explanatory of an excitation unit according to modification 12 of the present invention.

Whereas, in the above-described preferred embodiment, as the shape of the connecting member 511, a cylindrical shape having a substantially identical diameter to the diameter of the voice coil 512 is adopted, the shape of the connecting member 511 is not limited to this example. FIG. 21 is a diagram, illustrating an example of the excitation unit of the present invention having the connecting member 511 having a not cylindrical shape. The connecting member 511 of the excitation unit 50 illustrated in FIG. 21 includes a hollow, cylindrical main body 5111 whose top face is closed and whose bottom face is open, and a cylindrical supporting rod 5112 whose bottom face is attached to the top face of the main body 5111 such that the supporting rod is extended upward from the center of the top face of the main body 5111. The top face of the supporting rod 5112 is connected to the bottom face of the soundboard 7 and the soundboard 7 is vibrated by the top face of the supporting rod 5112.

According to the excitation unit 50 having the connecting member 511 having the shape as shown in FIG. 21, the rib 75 is arranged near a desired position (e.g., a position corresponding to the bridge 6) where the excitation unit 50 is desired to be disposed. Even if the shape of the connecting member 511 of the above-described embodiment interferes with the rib 75, the connecting member 511 of the modification 12 can be connected to the soundboard 7 as long as the supporting rod 5112 does not interfere with the rib 75.

[Modification 13]

Figure 22A:
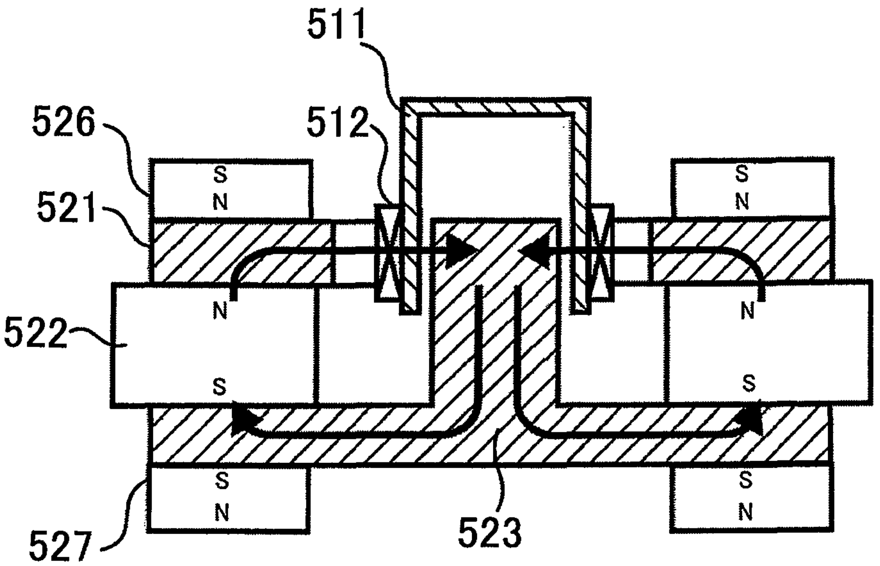
FIGS. 22A and 22B are cross-sectional views explanatory of an excitation unit according to modification 13 of the present invention.
Figure 22B:
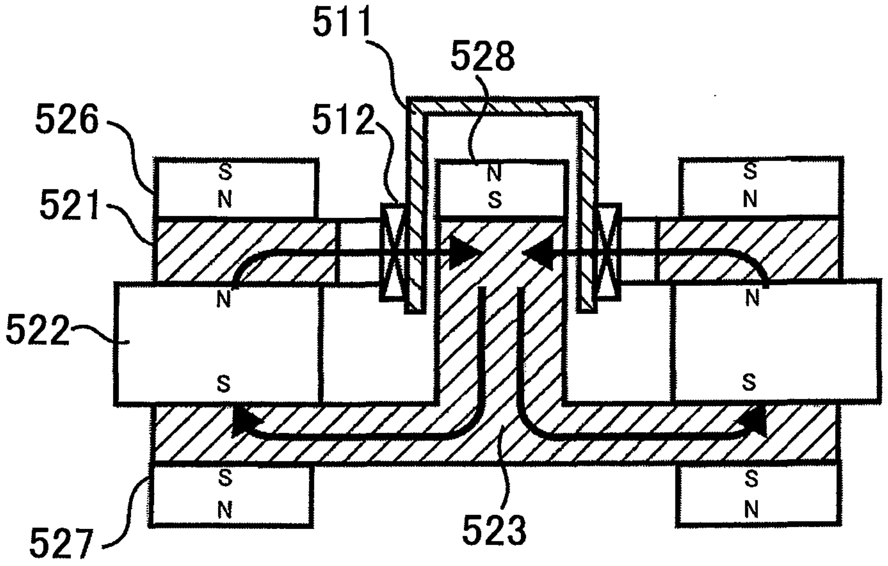

As modification 13, the yoke-holding unit 52 of the above-described embodiment can be modified in such a manner as to provide with another magnet in addition to the magnet 522 in order to increase magnetic flux passing through the magnetic path space 525. FIGS. 22A, 22B are cross-sectional views explanatory of an excitation unit according to the modification. In FIGS. 22A and 22B, ring-like magnets 526, 527 are arranged on the top face of the yoke 521 and the bottom face of the yoke 523 respectively so as to oppose the magnet 522. In the modification 13 illustrated in FIG. 22B, a further magnet 528 is arranged on the top face of a pole of the yoke 523.

In FIGS. 22A and 22B, the magnets 526, 527 are arranged such that the polarities are opposite to the polarity of the magnet 522. The magnet 528 is arranged such that the polarity is in the same as the polarity of the magnet 522. With this arrangement, magnetic flux intending to leak upward from the yoke 521 and magnetic flux intending to leak downward from the yoke 523 are introduced into the magnetic path by the magnet 527. As a result, leakage magnetic flux is reduced so that magnetic flux passing through the magnetic path space 525 is increased. It should be noted that it is not necessary to provide with both the magnets 526 and 527, but only one of them may be provided. In FIG. 22B, because the magnetic flux intending to leak upward from the top face of the pole of the yoke 523 is introduced into the magnetic path by the magnet 528, the magnetic flux passing through the magnetic path space 525 is increased. As a result, the excitation unit 50 having the yoke-holding unit 52 employing the modification 13 shown in FIG. 22A or 22B can obtain drive force larger than that of the excitation unit 50 shown in FIGS. 5 and 14, for example.

[Modification 14]

Whereas, in the embodiment described with reference to FIG. 13, in order to determine the frequency characteristics H and L to be set in the equalizer unit 152, the signal generation unit 15 generates an impulse signal and input the same to the excitation units 50H, 50L as the drive signal, another construction may be employed as mentioned below. Namely, the drive signal output from the signal generation unit 15 to the excitation units 50H, 50L is not limited to the impulse signal, but may be another waveform signal such as time-stretched pulse (TSP) signal or a swept sine signal.

However, when a signal like the TSP signal which continues longer than the impulse signal is supplied to the excitation units 50H, 50L, to the soundboard 7 currently vibrating in response to a preceding part of the signal, excitation by a following part of the signal is added. In this case, it is recommended to remove an influence by the additional excitation onto the vibration waveform of the soundboard 7 by subtracting waveforms indicated by the drive signal from voltage waveforms obtained by measuring the vibration of the voice coil.

Alternatively, in order to determine the frequency characteristics H and L to be set in the equalizer unit 152, instead of excitation of the soundboard 7 in response to the impulse signal from the excitation units 50H, 50L, it may be configured such that a person in charge of adjustment in a manufacturing process actually strike the soundboard 7 at the connection positions H, L with a hammer or the like (a tool which never damages the soundboard 7 by striking) and then the frequency characteristic specifying unit 155 processes voltage values corresponding to resultant vibration of the soundboard 7.

[Modification 15]

Whereas, in the above-described preferred embodiment and modification, the piano is employed as an example of the keyboard instrument. However, the present invention may be applied to other keyboard instrument than the piano, such as a celesta having a metallic sound board as a sounding body instead of the string, or a percussion instrument.

This application is based on, and claims priorities to, JP PA No. 2011-200677 filed on 14 Sep. 2011, JP PA No. 2011-200678 filed on 14 Sep. 2011, JP PA No. 2011-200679 filed on 14 Sep. 2011, JP PA No. 2012-200456 filed on 12 Sep. 2012, JP PA No. 2012-200457 filed on 12 Sep. 2012 and, JP PA No. 2012-200458 filed on 12 Sep. 2012. The disclosure of the priority applications, in its entirety, including the drawings, claims, and the specification thereof, are incorporated herein by reference.

What is claimed is:

1. A keyboard instrument comprising:

a plurality of keys;

a plurality of sounding bodies each provided in corresponding relation to each of the plurality of keys;

a plurality of hammers each responsive to an operation of any one of the keys and configured to strike the sounding body corresponding to the operated key;

a stopper configured to prevent the hammer from striking the sounding body;

a soundboard configured to be vibrated with vibration of the sounding body;

an excitation unit including a vibration member connected to the soundboard and a main body heavier than the vibration members, the excitation unit configured to generate at least one of attraction force and repulsion force between the vibration member and the main body in response to a drive signal supplied thereto to vibrate the vibration member;

a supporting unit configured to support the main body so that less or no load of the main body is applied to the soundboard at least in a state in which the soundboard is not vibrated;

a performance information generation unit configured to generate performance information corresponding to an operation of the key;

a signal generation unit configured to generate an audio waveform signal based on the performance information, the generated audio waveform signal being supplied to the excitation unit as the drive signal to thereby vibrate the vibration member; and a controlling unit configured to control the stopper in such a manner as to permit or not to permit the stopper to prevent the hammer from striking the sounding body when the vibration member is vibrated in response to the drive signal.

2. The keyboard instrument according to claim 1, wherein any one of a plurality of sound generation modes is selectable, and when a predetermined special sound generation mode is selected by a user from among the plurality of the sound generation modes, the vibration member is vibrated according to the drive signal.

3. The keyboard instrument according to claim 2, wherein, if the selected predetermined special sound generation mode is a first special sound generation mode, the controlling unit permits the stopper to prevent the hammer from striking the sounding body.

4. The keyboard instrument according to claim 1, wherein the main body has a magnet, and the vibration member has a voice coil which is arranged on a magnetic path formed by the magnet and to which the drive signal is input.

5. The keyboard instrument according to claim 4, wherein the vibration member and the main body are separated from each other by space, and the supporting unit supports the main body such that the main body is not in contact with the soundboard.

6. The keyboard instrument according to claim 4, wherein the vibration member and the main body are connected via a damper unit, and the supporting unit supports a load of the vibration member via the damper unit and the main body .

7. The keyboard instrument according to claim 4, wherein the main body is fixed to a supporting column or a side plate of the keyboard instrument.

8. The keyboard instrument according to f claim 1, wherein the vibration member is formed of sheet-like magnetic material attached to the soundboard;

the excitation unit contains an electromagnet that is magnetically coupled with the sheet-like magnetic material via an air gap and excited by the drive signal; and the supporting unit supports the electromagnet.

9. The keyboard instrument according to claim 1, wherein the signal generation unit has an equalizer unit configured to adjust frequency characteristics of the drive signal.

* * * * *